(12) United States Patent
Spexarth et al.

(10) Patent No.: US 9,482,378 B2
(45) Date of Patent: Nov. 1, 2016

(54) RAPID RELEASE EMERGENCY DISCONNECT SYSTEM INCORPORATING AN INTEGRATED HYDRAULIC SKID

(71) Applicant: Oceaneering International, Inc., Houston, TX (US)

(72) Inventors: Gary R. Spexarth, Houston, TX (US); Richard Allan Myers, Houston, TX (US); Kyle William Gebhardt, Houston, TX (US); Alexander Robert Voss, Cypress, TX (US); Jordan Ashley Carter, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 126 days.

(21) Appl. No.: 14/496,336

(22) Filed: Sep. 25, 2014

(65) Prior Publication Data

US 2015/0090339 A1 Apr. 2, 2015

Related U.S. Application Data

(60) Provisional application No. 61/883,916, filed on Sep. 27, 2013, provisional application No. 61/892,291, filed on Oct. 17, 2013.

(51) Int. Cl.

| F16K 11/20 | (2006.01) |
|---|---|
| F16L 37/38 | (2006.01) |
| F16L 37/23 | (2006.01) |
| F16L 37/407 | (2006.01) |
| F16L 37/62 | (2006.01) |
| F16L 37/33 | (2006.01) |
| F16L 1/19 | (2006.01) |
| F16L 1/24 | (2006.01) |
| B63B 22/00 | (2006.01) |
| B63B 27/24 | (2006.01) |

(52) U.S. Cl.
CPC ............... *F16L 37/38* (2013.01); *B63B 22/00* (2013.01); *F16L 1/19* (2013.01); *F16L 1/24* (2013.01); *F16L 37/23* (2013.01); *F16L 37/33* (2013.01); *F16L 37/407* (2013.01); *F16L 37/62* (2013.01); *B63B 27/24* (2013.01); *Y10T 137/0318* (2015.04); *Y10T 137/87965* (2015.04)

(58) Field of Classification Search
CPC ....... F16L 37/407; F16L 37/23; F16L 37/33; F16L 37/62; F16L 1/19; F16L 1/24; Y10T 137/0318; Y10T 137/87965; Y10T 137/87249

See application file for complete search history.

(56) References Cited

U.S. PATENT DOCUMENTS

| 4,863,314 A * | 9/1989 | Baugh | F16L 37/62 |
|---|---|---|---|
| | | | 166/338 |
| 8,961,071 B2 * | 2/2015 | Critsinelis | B63B 22/00 |
| | | | 405/158 |
| 2009/0051163 A1 * | 2/2009 | Frey | E02F 3/3627 |
| | | | 285/305 |
| 2010/0180915 A1 * | 7/2010 | Patel | B08B 9/023 |
| | | | 134/6 |
| 2013/0309016 A1 * | 11/2013 | McKee | F16L 1/202 |
| | | | 405/170 |

* cited by examiner

*Primary Examiner* — Jessica Cahill
(74) *Attorney, Agent, or Firm* — Maze IP Law, PC

(57) ABSTRACT

In various embodiments, fluid conduits such as high pressure hoses deployed in-between two sea-fairing vessels may be released during an emergency by using a rapid release emergency disconnect system as described herein, where the rapid release emergency disconnect system may engage with a hanger such as an industry standard frac hanger and be used in-line with fluid conduits such as high-pressure lines. Various skid embodiments are described which can be configured to interface with one or more of the described rapid release emergency disconnect systems.

20 Claims, 20 Drawing Sheets

CLOSED

OPEN

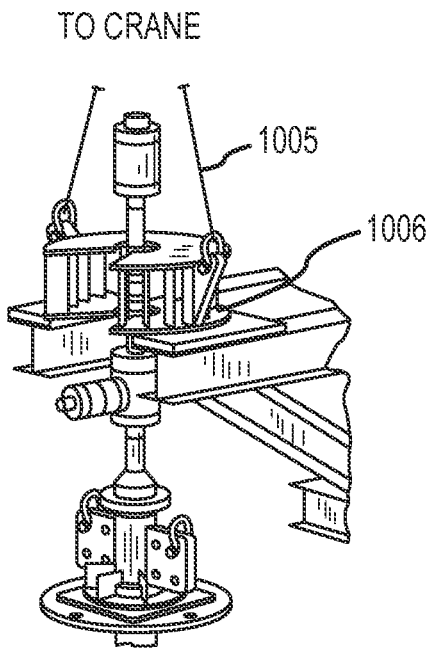 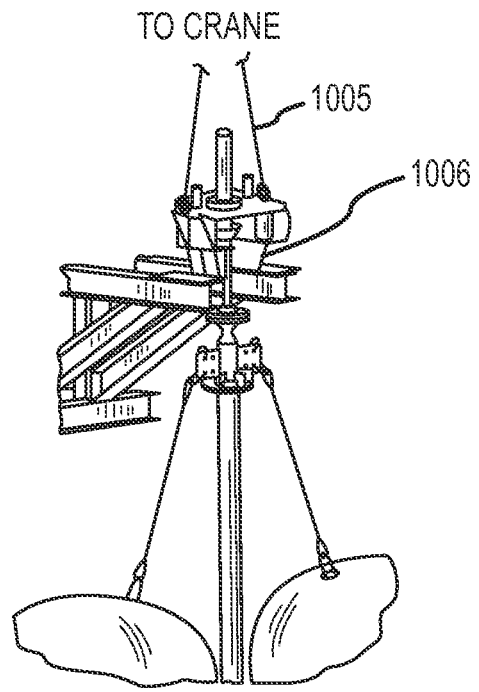
FIG.24A  FIG.24B
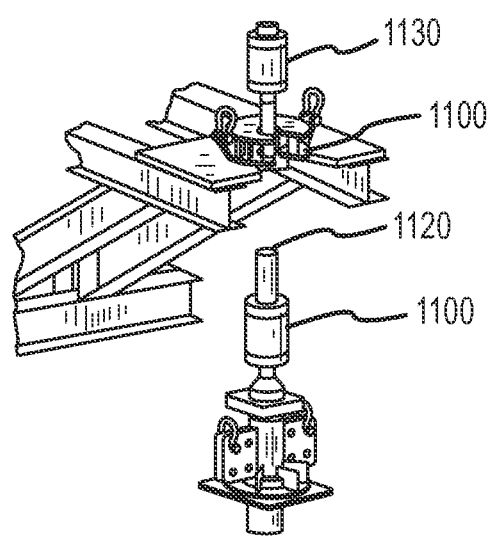
FIG.25

RAPID RELEASE EMERGENCY DISCONNECT SYSTEM INCORPORATING AN INTEGRATED HYDRAULIC SKID

RELATION TO OTHER APPLICATIONS

This application claims priority U.S. Provisional Patent Application #61/883,916 filed Sep. 27, 2013 and U.S. Provisional Patent Application #61/892,291 filed Oct. 17, 2013.

BACKGROUND

Current quick release systems do not interface to a standard frac hanger, cannot open at extreme pressure, and do not contain an integrated floatation system. Additionally, should separation occur, current quick release systems must return to the dock to re-connect a fluid conduit such as a flex-hose.

Moreover, current hydraulic skids just provide hydraulic pressure, and are either "on" or "off", similar to a water pump, and are not as flexible when interfacing with quick release systems.

FIGURES

Various figures are included herein which illustrate aspects of embodiments of the disclosed inventions.

FIGS. 22A-24B are views in partial perspective of deployment of two exemplary emergency quick disconnect systems; and FIGS. 25-27 are views in partial perspective of an exemplary emergency quick disconnect system being engaged to disconnect.

DESCRIPTION OF EXEMPLARY EMBODIMENTS

Figure 1:
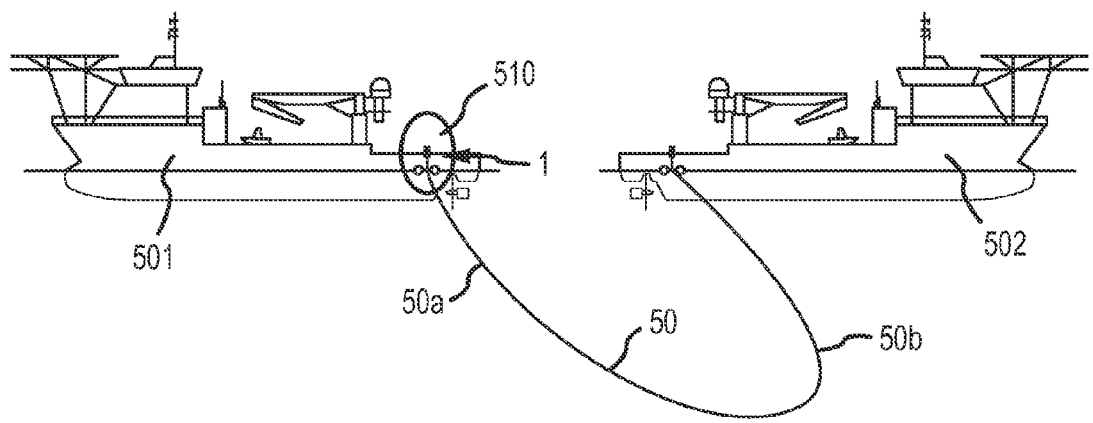
FIG. 1 is a schematic view in partial perspective of two vessels and interconnected fluid conduits.

Referring generally to FIG. 1, it is often desirable to deploy fluid conduits such as high pressure hoses from vessel 500 including fluid conduits connected in-between two sea-fairing vessels 500 such as vessels 501 and 502. Generally vessel 500 comprises hanger 510 which is typically an industry standard frac hanger. In various embodiments, rapid release emergency quick disconnect system 100 (or other embodiments described herein below) may engage with such a hanger and be used in-line with fluid conduits such as high-pressure. If "drift" occurs where such a high-pressure lines exists connecting two sea-fairing vessels such as vessel 501 and vessel 502, e.g. one of the vessels 500 begins to move away from the other, the high-pressure line connecting the two will experience extremely high tensions, resulting in potentially catastrophic results such as loss of life and/or vessel damages. Although this is an example of a use of the disconnect embodiments described herein, one of ordinary skill in these arts will understand that there are many other such uses of the disconnect embodiments described herein.

In general, the various system embodiments described herein are capable of closing off the fluid pressure in the fluid conduits, including at line pressures up to 15,000 psi, and separating them into two separate lines in a short time, typically less than 8 seconds.

Figure 2:
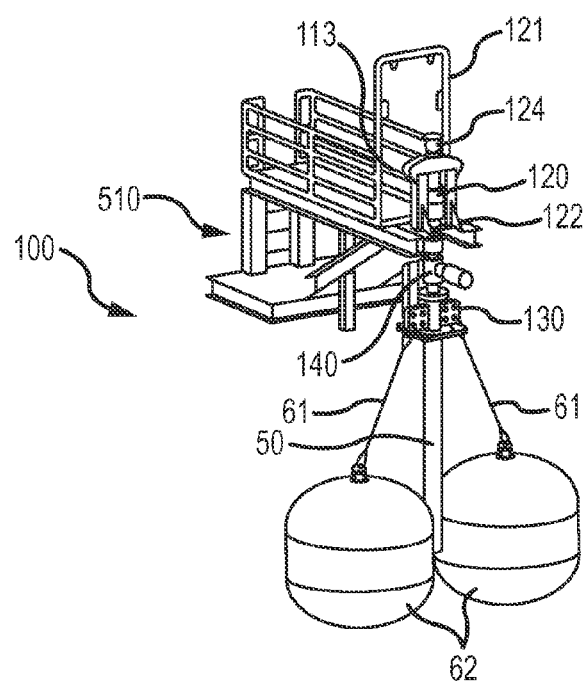
FIG. 2 is a view in partial perspective of an exemplary embodiment of a first embodiment of an emergency quick disconnect system.
Figure 3:
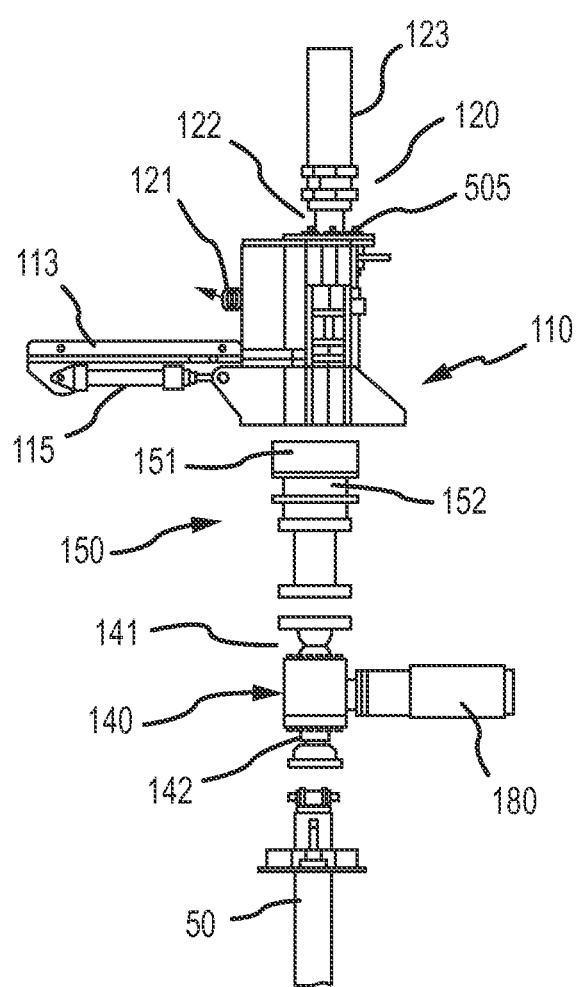
FIGS. 3 and 4 are exploded views in partial perspective of the exemplary embodiment of the first embodiment of an emergency quick disconnect system.
Figure 4:
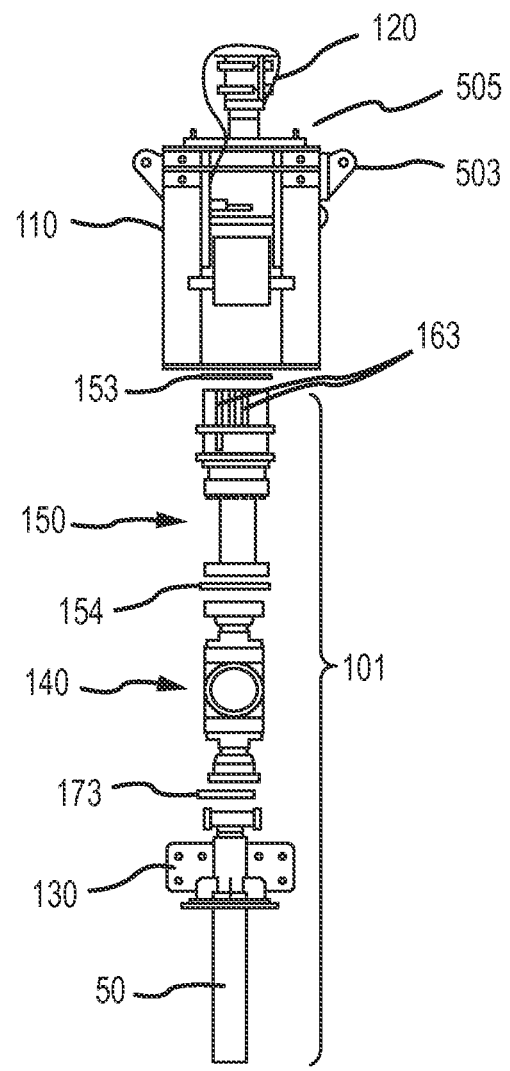

Referring to FIGS. 2-4 and specifically to FIG. 2, in a first embodiment, emergency quick disconnect system 100 comprises connector 120; connector interface 110 (FIG. 3) configured to receive connector 120; and drop away assembly 101 (FIG. 4). A suitable connector 120 for this embodiment would be an M5 connector manufactured by Oceaneering International, Inc. of Houston, Tex.

Connector 120 is generally configured to interface with hose 50 which may be a co-flex hose, a high pressure hose, or the like. Connector 120 typically comprises first fluid interface 121 and second fluid interface 122 in fluid communication with first fluid interface 121, where at least one of first fluid interface 121 and fourth fluid interface 142 comprises an interface configured to interface with hose 50. Support seal 153 may be disposed intermediate connector 120 and vertical structural interface 150.

Hanger 510 may be an industry standard frac hanger. Additionally, hanger 510 may further comprise one or more padeyes 503. In certain embodiments, hanger 510 further comprises one or more alignment pins 505 configured to allow connector 120 to move in a predetermined direction when opening second fluid interface 122.

Connector interface 110 (FIG. 3) is typically configured to be accepted into hanger 510, such as removably accepted into hanger 510, and support connector 120 when connector interface 110 is received into hanger 510.

Connector interface 110 typically further comprises refraction fork 113 (FIG. 2) and retraction fork actuator 115 (FIG. 2) operatively in communication with retraction fork 113. Retraction fork actuator 115 may comprise a pneumatic cylinder, a hydraulic cylinder configured, or the like, or a combination thereof, such as cylinder 651 (FIG. 18) and be configured to selectively move retraction fork 113 in a predetermined plane.

Referring more specifically to FIG. 4, in embodiments, drop away assembly 101 comprises valve 140 typically configured to be in fluid communication with fluid conduit 50 which may be a co-flex hose, a high pressure hose, or the like.

Valve 140 typically comprises third fluid interface 141 and fourth fluid interface 142 in fluid communication with third fluid interface 141. Valve 140 is typically configured to stop flow of a fluid in-between third fluid interface 141 and fourth fluid interface 142 and is further typically disposed downstream with respect to and in fluid communication with connector 120. Valve seal 154 may be present and disposed intermediate vertical structural interface 150 and valve 140. Additionally, hose end seal 173 may be disposed intermediate hose end 130 and valve 140.

In certain embodiments, actuator 180 is operatively connected to valve 140 and may comprise a check valve (not shown in the figures) configured to automatically close at a pre-defined delta-pressure and/or a selectively activated ball valve (not shown in the figures). These common valve elements will be familiar to those of ordinary skill in these arts. If a ball valve is present, it may comprise a spring-actuated, normally closed ball valve and may be remotely operated, manually operated, or the like, or a combination thereof.

Drop away assembly 101 further generally comprises vertical structural interface 150, comprising support bucket 151, which is configured to be removably connected to hanger 510, and structural interface 152 configured to be received into and be supported by hanger 510.

In certain embodiments drop away assembly 101 further comprises hose end connector 130 connected to valve 140. In these embodiments, seal 173 may be disposed intermediate hose end connector 130 and valve 140.

In these configurations, connector 120 and/or valve 140 are typically further configured to allow a fluid conduit, e.g. 50, to be connected and sealed while offshore. Moreover, connector 120 and/or valve 140 may further be configured to seal their respective fluid connections at fluid pressures of up to around 15,000 psi of internal fluid.

Figure 6:
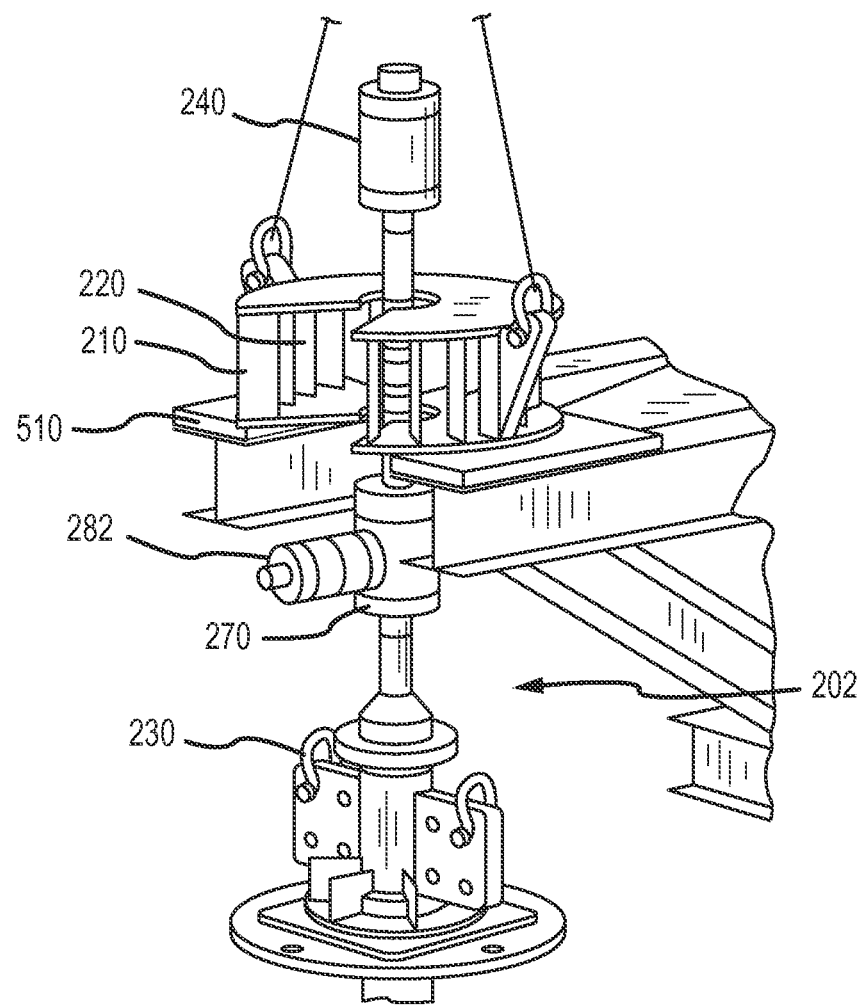
FIGS. 6 and 7 are exploded views in partial perspective of the exemplary embodiment of the second embodiment of an emergency quick disconnect system.
Figure 7:
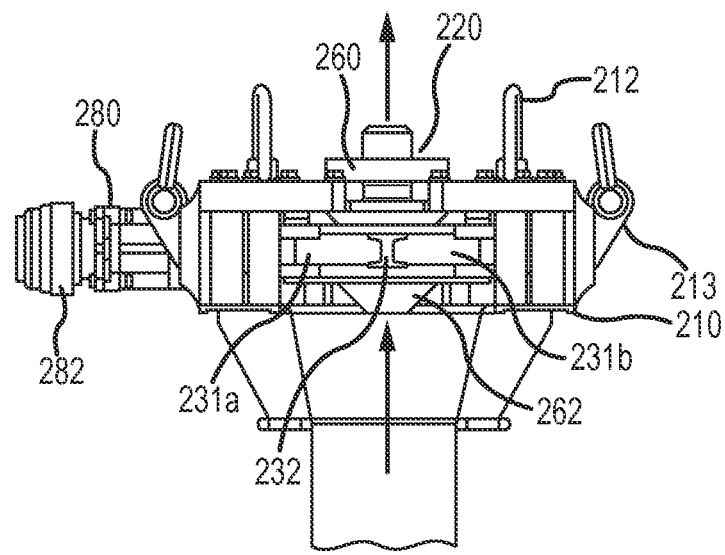

In a second embodiment, referring now generally to FIGS. 6-7 and more specifically to FIG. 6, emergency quick disconnect system 200 comprises check valve 240, comprising first fluid interface 241 and second fluid interface 242 in fluid communication with first fluid interface 241; connector 220 disposed downstream of, connected to, and in fluid communication with check valve 240, where connector 220 comprises third fluid interface 221 and fourth fluid interface 222 in fluid communication with third fluid interface 221; drop away assembly 202; and connector interface 210.

Check valve 240 is typically configured to stop flow of a fluid between first fluid interface 241 and second fluid interface 242 when fluid pressure of a fluid present in check valve 240 falls below a predetermined level, e.g. to automatically close at a pre-defined delta-pressure. First fluid interface 241 is typically configured to interface with a high pressure hose 50 such as a co-flex hose.

Connector 220 may further comprise one or more padeyes (212). A suitable connector 220 for this embodiment would be a Graylock connector manufactured by Oceaneering International, Inc. of Houston, Tex.

Connector 220 may further comprise top hub 260 configured to remain in position after drop away assembly 202 falls away and/or bottom hub 262 configured to fall away with drop away assembly 202.

Drop away assembly 202 typically comprises control valve 270 and hose end connector 230 connected to control valve 270. Control valve 270 is generally in fluid communication with connector 220 and configured to be in fluid communication with fluid conduit 50. Control valve 270 may comprise a selectively activated ball valve which may further comprise a spring-actuated, normally closed ball valve. Additionally, the selectively activated ball valve may be remotely operated and/or manually operated. In embodiments, control valve 270 is configured to interface with a high pressure hose 50 such as a co-flex hose.

Connector interface 210 is typically configured to receive connector 220 and configured to be removably accepted into hanger 510 and support connector 220 and drop away assembly 202 when connector interface 210 is received into hanger 510. Hanger 510 may comprise an industry standard frac hanger.

Referring in addition to FIG. 7, in certain embodiments, control valve 270 may further comprise drive 280 operative coupled to actuator 282 which may be a hydraulic motor. Actuator 282 is configured to change a position of drive 280 and selectively open and close control valve 270. Drive 280, which may comprise a screw drive, is typically coupled to at least one of first clamp 231*a* or second clamp 231*b* which are configured to open, thereby allowing drop away assembly 202 to be released and fall away.

In certain embodiments, emergency quick disconnect system 200 further comprises first clamp 231*a* connected to connector 220; second clamp 231*b* connected to first clamp 231*a;* and seal ring 232 disposed intermediate first clamp 231*a* and second clamp 232*b.*

In any of these embodiments, connector 220 and/or check valve 240 may be configured to allow fluid conduit 50 to be connected and sealed while offshore. Further, in any of these embodiments connector 220, check valve 240, and control valve 270 may be configured to seal a fluid connection up to around 15,000 psi of internal fluid.

Figure 8:
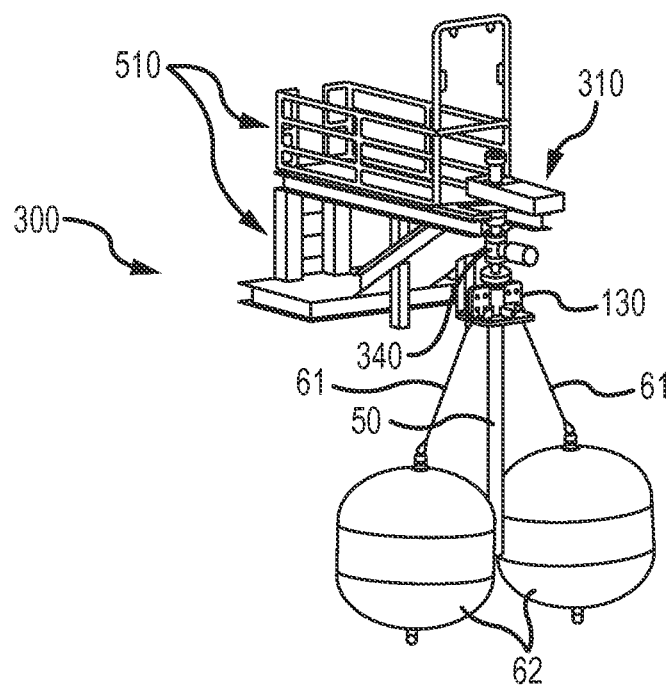
FIG. 8 is a view in partial perspective of an exemplary embodiment of a third embodiment of an emergency quick disconnect system.
Figure 9:
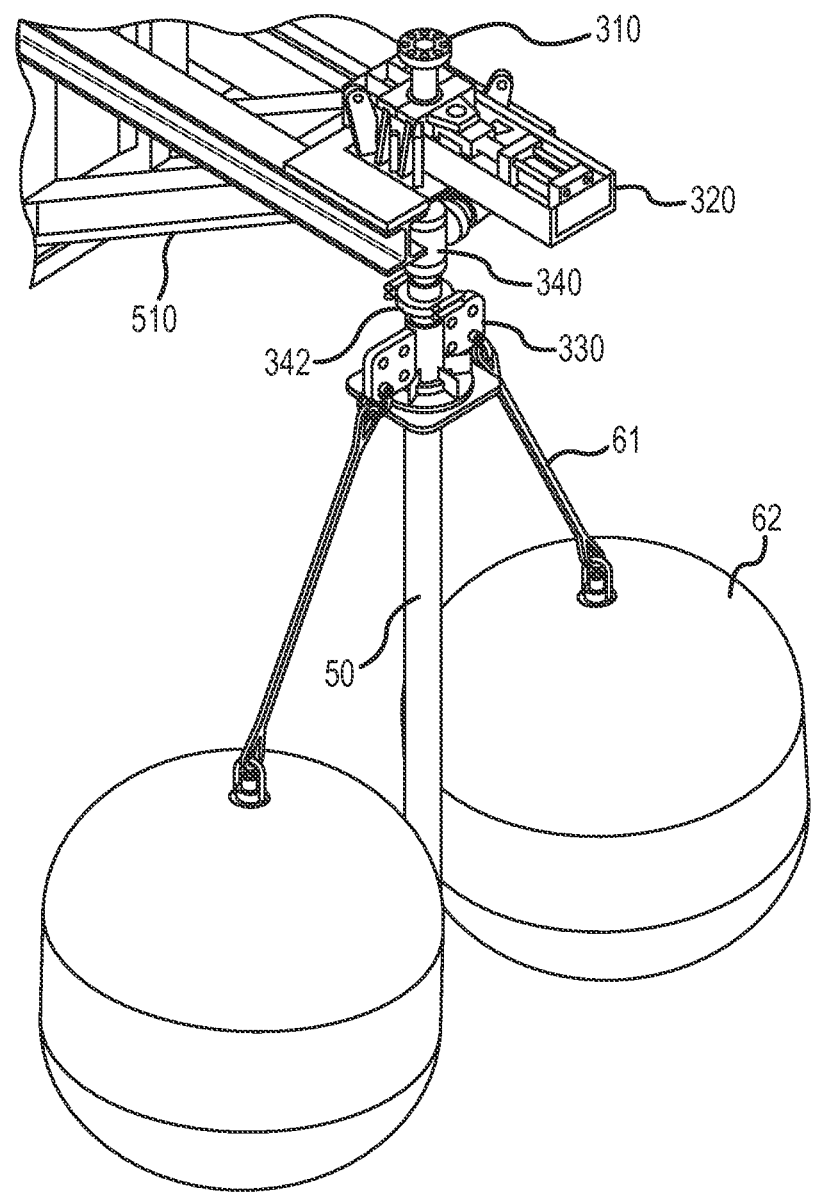
FIG. 9 is a view in partial perspective of an exemplary embodiment of the third embodiment of an emergency quick disconnect system.

In a third embodiment, referring now generally to FIGS. 8-13*b* and more specifically to FIG. 8, emergency quick disconnect system 300 comprises connector 320 and drop away assembly 302. At least one of connector 320 and valve 340 are configured to allow a fluid conduit such as hose 50 to be connected and sealed while offshore and further configured to seal a fluid connection up to around 15,000 psi of internal fluid.

Connector 320 typically comprises first fluid interface 321 and second fluid interface 322 in fluid communication with first fluid interface 321. A suitable connector 320 for this embodiment would be an OPG/RAM connector manufactured by Oceaneering International, Inc. of Houston, Tex.

Drop away assembly 302 comprises hub and clamp interface 370; valve 340 connected to the hub and clamp interface 370 and disposed upstream from and in fluid communication with connector 320; connector interface 310 configured to be removably accepted into hanger 510 and support connector 320 and valve 340 when connector interface 310 is received into the hanger.

Hub and clamp interface 370 generally comprises first hub 371, second hub 374, and hub clamp 372 disposed intermediate first hub 371 and second hub 374. In certain embodiments hub and clamp interface 370 further comprises seal 373.

Valve 340 typically comprises third fluid interface 341 and fourth fluid interface 342 in fluid communication with third fluid interface 341, where valve 340 is typically configured to stop flow of a fluid between the third fluid interface and the fourth fluid interface. As those of ordinary skill in these arts will understand, valve 340 may comprise a check valve which may be configured to automatically close at a pre-defined delta-pressure, and/or a selectively activated ball valve where the activation may be remotely or manually operated.

In certain embodiments, valve 340 may further comprise valve actuator 380 which may be configured to be operated by a remotely operated vehicle, pneumatic pressure, mechanical springs, or the like, or a combination thereof.

Connector interface 310 typically comprises clamp seal 312, comprising first clamp section 312a and second clamp section 312b where clamp 312 is configured to selectively compress seal 361 against connector 320 where seal 361 may be one or more of an O-ring, a gasket, and/or a seal ring. Connector interface 320 is typically configured to interface to a standard frac hanger design.

Connector interface 310 typically further comprises one or more retraction pins 313 configured to engage hub and clamp interface 370 and one or more actuators 311 configured to selectively compress and seal clamp 312 against connector 320 and decompress and release clamp seal 312.

Actuator 311 may comprise one or more of a hydraulic actuator, a pneumatic actuator, and/or a screw-drive.

Hose end connector 330 may be present and connected to hub and clamp interface 370. Additionally, hose clamp 330 may be connected to hub and clamp interface 370 and configured to receive fluid conduit 50 therethrough.

In the various configurations of this embodiment, first fluid interface 321 and/or fourth fluid interface 342 may be configured to connect to a high-pressure hose 50 such as a co-flex hose.

Figure 14:
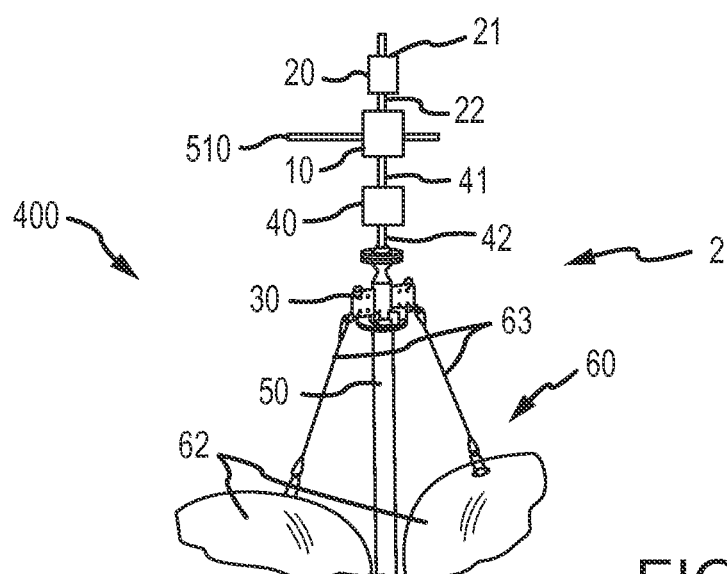
FIG. 14 is a view in partial perspective of a first exemplary flotation assembly.
Figure 15:
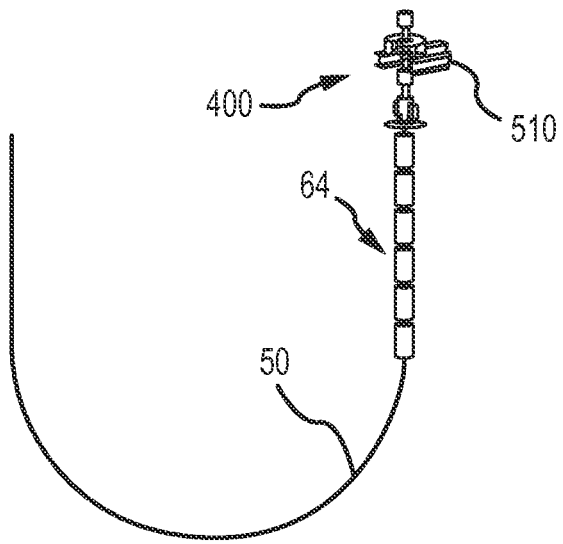
FIG. 15 is a view in partial perspective of a second exemplary flotation assembly.

Referring now to FIGS. 14 and 15, in most of these configurations emergency quick disconnect system 400 comprises connector 20 comprising first fluid interface 21 and second fluid interface 22 in fluid communication with first fluid interface 20; connector interface 10, configured to receive connector 20 and configured to be removably accepted into hanger 510 and support connector 20 when connector interface 21 is received into hanger 510; drop away assembly 2; and buoyancy apparatus 60 connected to connector 20, where buoyancy apparatus 60 comprises a sufficient buoyancy to support the weight of drop away assembly 2.

Generally, drop away assembly 2 comprises valve 40 which comprises third fluid interface 41 and fourth fluid interface 42 in fluid communication with third fluid interface 41. Valve 40 is configured to stop flow of a fluid in-between third fluid interface 41 and fourth fluid interface 40. Valve 40 is further configured to be in fluid communication with fluid conduit 50.

Emergency quick disconnect system 4 may further comprise hose end connector 30 connected to valve 40. In these embodiments, buoyancy apparatus 60 is typically connected to hose end connector 30.

Buoyancy apparatus 60 generally comprises one or more buoy riggings 63 connected to hose end connector 30 and one or more buoys 62 connected to buoy rigging 63. Generally, one buoy 62 will be connected to one buoy rigging 63. Each buoy 62 may comprise or be otherwise configured as a float, typically a buoyant float configured to contain sufficient buoyancy to support the weight of the drop away assembly 2 and the entire section of hose 50 to which buoy 62 is connected.

Although described with emergency quick disconnect system 400, this embodiment of buoyancy apparatus 60 with buoys 62 may be used with any of the embodiments described herein above, i.e. emergency quick disconnect system 100 (FIG. 1), emergency quick disconnect system 200 (FIG. 5), and emergency quick disconnect system 300 (FIG. 8).

Referring more specifically to FIG. 15, in an alternative configuration, emergency quick disconnect system 400 comprises connector 20, comprising a first fluid interface 21 and second fluid interface 22 in fluid communication with first fluid interface 21; connector interface 10, configured to receive connector 20 and to be removably accepted into hanger 510 and support connector 20 when connector interface 21 is received into hanger 510; drop away assembly 2; fluid conduit 50 connected to drop away assembly 2; and one or more buoys 64 configured to be disposed about fluid conduit 50. In these embodiments, buoy 64 comprises sufficient buoyancy to support the weight of drop away assembly 2 and a section of fluid conduit 50 to which drop away assembly 2 is connected.

Drop away assembly 2 may generally comprise valve 40 which comprises third fluid interface 41 and fourth fluid interface 42 in fluid communication with third fluid interface 41, valve 40 being configured to stop flow of a fluid in-between third fluid interface 41 and fourth fluid interface 42. Valve 40 is typically disposed downstream with respect to and in fluid communication with connector 20 and further configured to be in fluid communication with fluid conduit 50.

Figure 16:
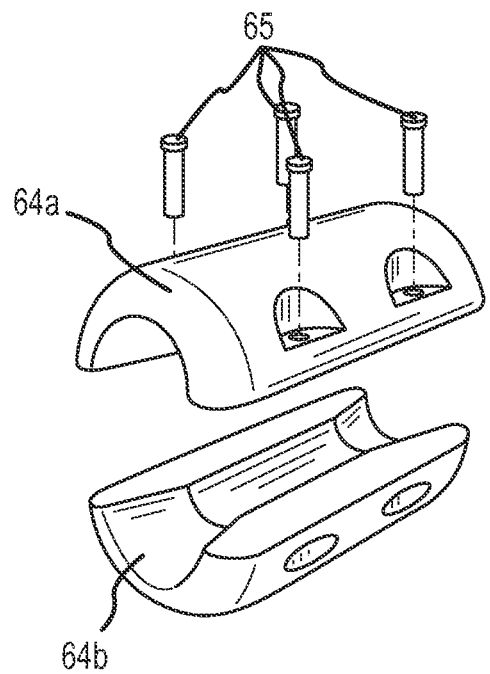
FIG. 16 is an exploded view in partial perspective of a component of the second exemplary flotation assembly.

Referring additionally to FIG. 16, in certain configurations, buoy 64 may comprise first buoy section 64a configured to at least partially receive fluid conduit 50 within an inner portion of first buoy section 64a and second buoy section 64b configured to at least partially receive fluid conduit 50 within an inner portion of second buoy section 64b, second buoy section 64b further configured to cooperatively engage first buoy section 64a about the fluid conduit. First buoy section 64a may be secured or releasably fastened to second buoy section 64b using any appropriate fastener 65.

Although described with emergency quick disconnect system 400, this embodiment of buoyancy apparatus 60 with buoys 64 may be used with any of the embodiments described herein above, i.e. emergency quick disconnect system 100 (FIG. 2), emergency quick disconnect system 200 (FIG. 5), and emergency quick disconnect system 300 (FIG. 8).

Figure 17:
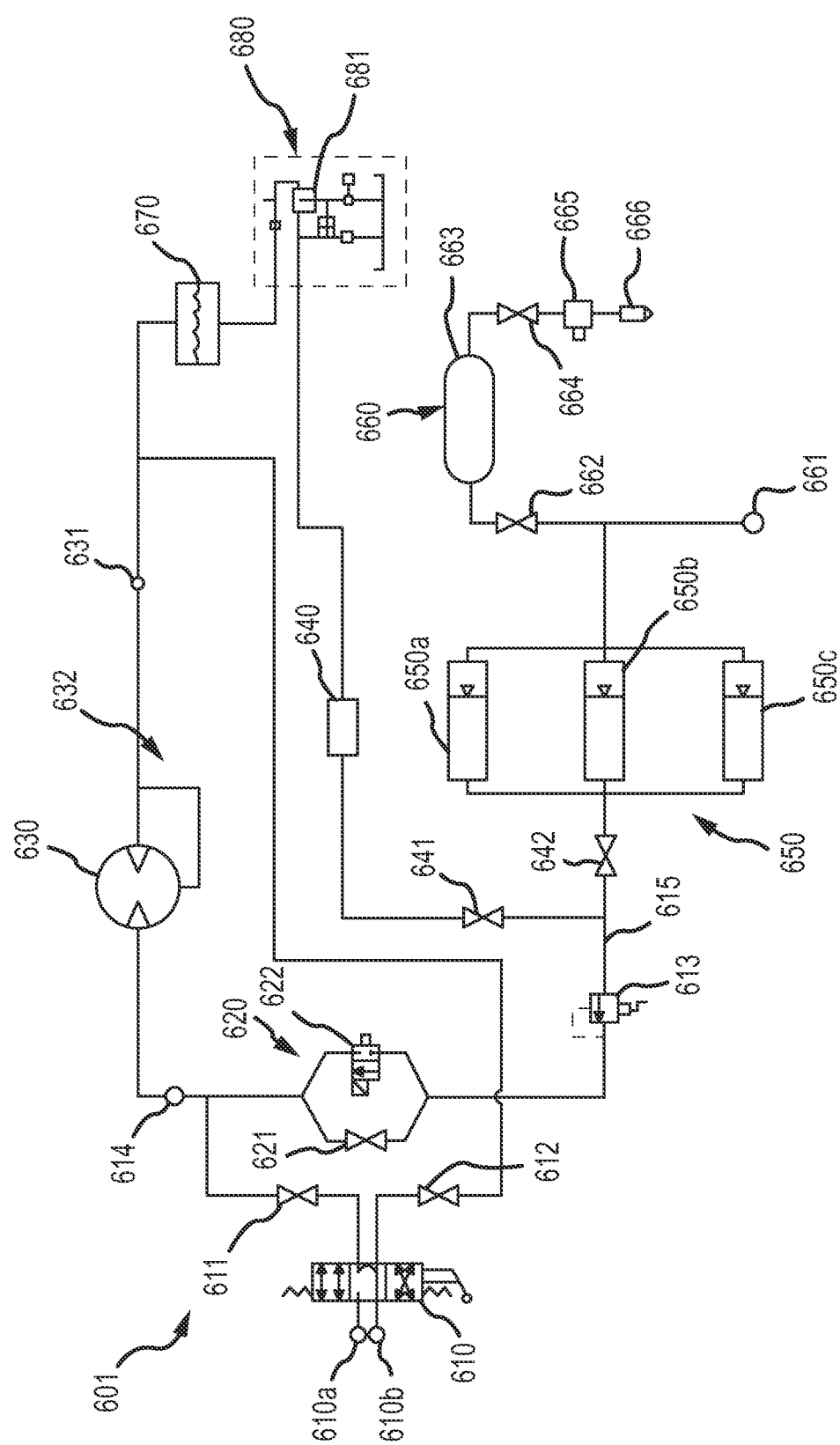
FIG. 17 is a schematic view of a first exemplary skid assembly.
Figure 18:
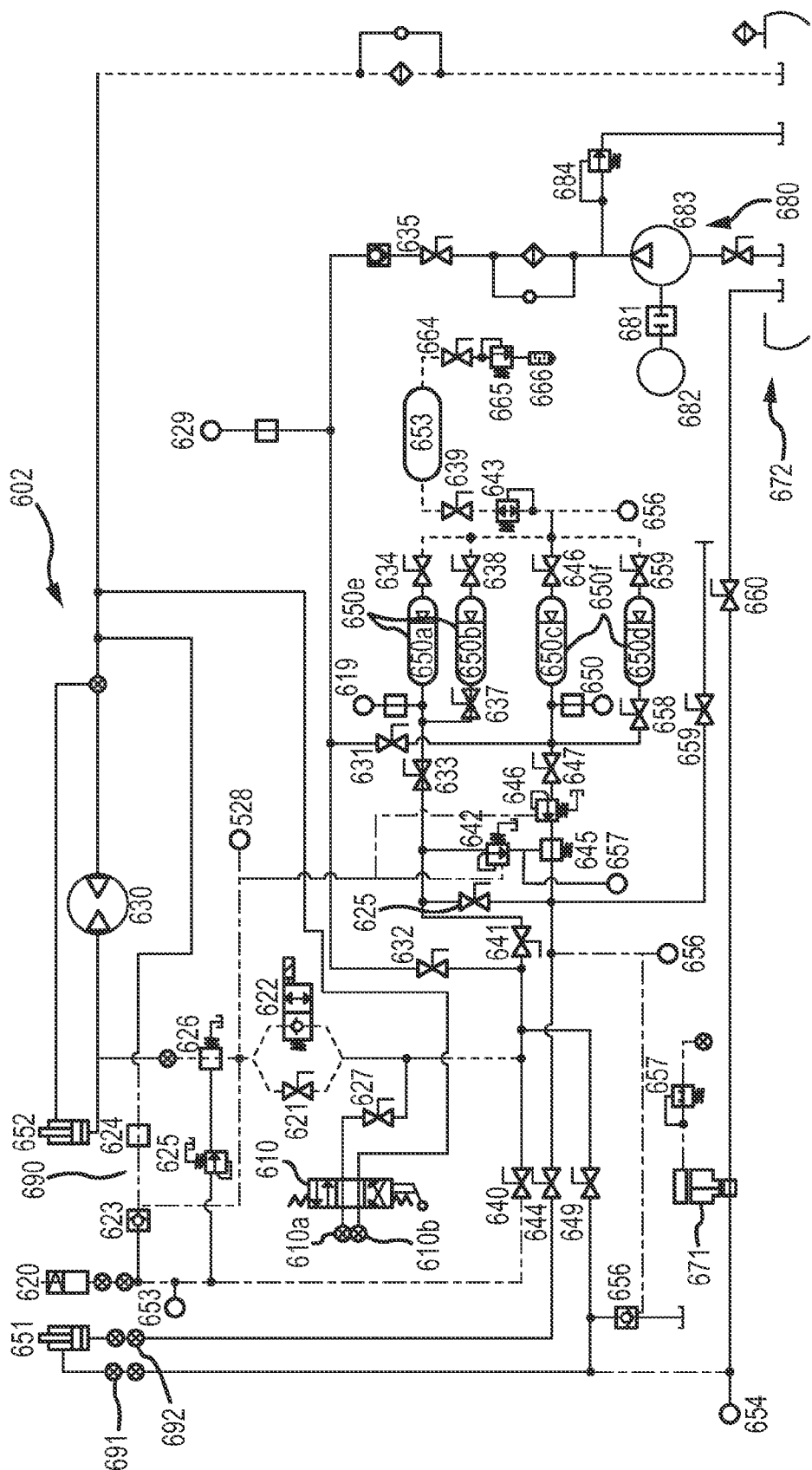
FIG. 18 is a schematic view of a second exemplary skid assembly.
Figure 19:
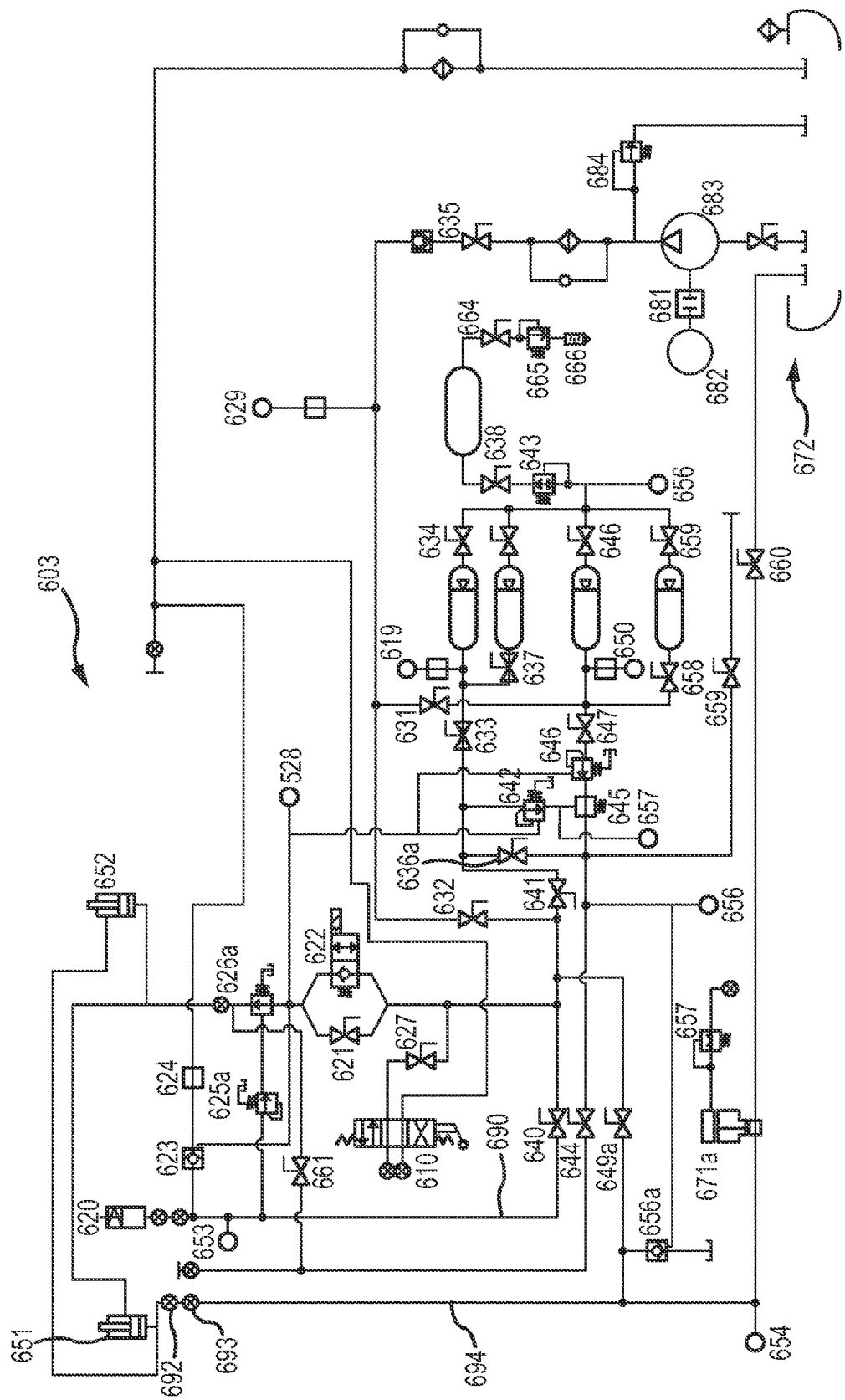
FIG. 19 is a schematic view of a third exemplary skid assembly.

Referring generally to FIGS. 17-19, any of the hydraulic skids described below, i.e. skids 601 (FIG. 17), 602 (FIGS. 18), and 603 (FIG. 19), is capable of being remotely actuated from the bridge and/or deck of vessel 500 (FIG. 1).

Referring specifically now to FIG. 17, hydraulic skid 601 may be used with, or may otherwise be part of, any of the emergency quick disconnect system embodiments described herein above. Generally, hydraulic skid 601 comprises of a series of hydraulic accumulators 650 that are pressurized with hydraulic fluid to a predetermined pressure such that when one value, e.g. valve 621, of a plurality of other valves are opened, either manually or remotely, and a series of actions take place in sequence that perform one or more predetermined functions, e.g. close a valve, open a connector, release a bottom section of pipe, and the like, or a combination thereof.

In a first embodiment hydraulic skid 601 comprises directional control valve 610; first valve 611 in fluid communication with fluid input 610a; hydraulic motor 630 in fluid communication with fluid valve 611, where hydraulic motor 630 typically further comprises fluid feedback 632; fluid reservoir 672 in fluid communication with hydraulic motor 630; quick connect 631 disposed intermediate and in fluid communication with hydraulic motor 630 and fluid reservoir 672; hydraulic power unit (HPU) 680 in fluid communication with fluid reservoir 672; intensifier 640 in fluid communication with HPU 680; second valve 641 in fluid communication with intensifier 640, where second valve 641 may further comprise a lock-out; pressure regulator valve 613 in fluid communication with second valve 641 and directional control valve 610; valve 620 in fluid communication with pressure regulator valve 613 and hydraulic motor 630; third valve 642 in fluid communication with second valve 641, where third valve 642 typically comprises a lock-out; one or more hydraulic accumulators 650 in fluid communication with third valve 642; and second fluid tank 660 in fluid communication with hydraulic accumulator 650.

Second fluid tank 660 typically further comprises dry gauge 661 in fluid communication with hydraulic accumulator 650; fluid tank 663; fourth valve 662 disposed intermediate and in fluid communication with hydraulic accumulator 650 and fluid tank 663; pressure relief valve 665; fifth valve 664 disposed intermediate and in fluid communication with fluid tank 663 and pressure relief valve 665; and pressure vent 666 in fluid communication with pressure relief valve 665. Fourth valve 662 may comprise a lock-out and be configured as a fluid isolation valve with respect to fluid tank 663. Fifth valve 664 may comprise a lock-out and also be configured as a fluid isolation valve with respect to fluid tank 663. Pressure vent 666 is typically configured to vent fluid into the surrounding atmosphere.

Directional control valve 610 may further comprise first fluid input 610a in fluid communication with first valve 611 and second fluid input 610b in fluid communication with fluid reservoir 672. Second fluid input 610b may also be in fluid communication with hydraulic motor 630.

HPU 680 typically comprises adjustable pressure relief valve 681. In certain embodiments, motor 682 may be connected to HPU 680. Pressure relief valve 684 may also be connected to HPU 680.

Valve 620 is typically electrically actuated and may further comprise a non-proportioning valve.

Intensifier 640 is typically a multi stage intensifier, e.g. a three stage intensifier.

Hydraulic skid 601 may further comprise sixth valve 612 disposed intermediate and in fluid communication with second fluid input 610b and hydraulic motor 630. In typical embodiments sixth valve 612 comprises a ball valve.

Hydraulic skid 601 may further comprise motor quick release 614 disposed intermediate and in fluid communication with first valve 611 and valve 620, where motor quick release 614 is in further fluid communication with hydraulic motor 630.

Each of first valve 611, second valve 641, third valve 641, fourth valve 662, and fifth valve 664 may comprise a ball valve.

Fluid tank 663 is typically configured as a tank for containing a gas such as nitrogen at a pressure of around 3000 psi. Pressure regulator valve 613 is typically configured to regulate pressures of from around 3000 to 5000 psi.

In embodiments, hydraulic accumulator 650 comprises a plurality of hydraulic, e.g. three accumulators 650a, 650b, 650c (FIG. 17) or four accumulators 650a, 650b, 650c, 650d (FIGS. 18-19), which may be arranged in series, parallel (as illustrated), or a combination thereof. Each hydraulic accumulator 650 is typically configured to accumulate around 15 gallons of fluid.

Referring now to FIGS. 18 and 19, in alternative embodiments hydraulic skid 601, 602 (FIGS. 18), and 603 (FIG. 19) may be similar to the embodiment described above but may also comprise hose cutter 652.

Referring specifically to FIG. 18, similar to skid 601 (FIG. 17), hydraulic skid 602 may be used with, or may otherwise be part of, the emergency quick disconnect system embodiment such as emergency quick disconnect system 100 described herein above in FIGS. 2-4. While counterbalance valves and sequence valves may be used to accomplish the same thing, due to differences in manufacturing process sequence valves will leak through their main line at a rate that is several orders of magnitude greater than the leak rate of counterbalance valves. All three counterbalance valves in the hydraulic circuit serve to gate off pressure access to the sequence valve pilot lines until the disconnect sequence is initiated.

Referring to FIG. 18, auxiliary directional valve 610, typically a directional valve, allows skid 602 to provide bi-directional hydraulic power to external tools as needed, such as by using ports 610a and 610b. Piper ball valve (PBV) 620 is typically a primary fluid access control between a field service vessel 501 (FIG. 1), e.g. a vessel receiving the well stim fluids, and chemical tanking vessel 502 (FIG. 1). Piper ball valve (PBV) 620 is held open by hydraulic power and upon loss of hydraulic power will fail closed, stopping fluid flow between vessels 501 and 502.

Solenoid driven cartridge valve 622 is typically an electrically driven spring return cartridge valve; as it is well within the knowledge of one of ordinary skill in the valve arts, the solenoid component of solenoid driven cartridge valve 622 is not necessary for the understanding of the inventions and is not shown in the figures. Normally, when not energized, solenoid driven cartridge valve 622 is closed, i.e. flow is blocked via a check valve. When the solenoid of solenoid driven cartridge valve 622 is energized, and only for so long as the solenoid is energized, solenoid driven cartridge valve 622 will open and will allow fluid to flow. In certain embodiments, electrical power may be provided to the solenoid manually such as via one or more push buttons which may be present on either or both skid 601 (FIG. 17), skid 602, or skid 603 (FIG. 19) and on the bridge of field service vessel 500 (e.g. vessel 501 in FIG. 1). In certain of these embodiments, such a push button may be configured to remain engaged once pressed, thus ensuring that electrical power will continue to energize the solenoid of solenoid driven cartridge valve 622.

Manual disconnect valve (MDV) 621 is a ball valve located on control skid 602 and serves as a backup in the event that primary electrically driven disconnect valve 622 fails to open for any reason. Both MDV 621 and an electrically driven disconnect valve such as solenoid driven cartridge valve 622 may be configured in parallel on the same fluid circuit and can initiate the disconnect sequence independently of each other.

First sequence valve (SV1) 623 typically is a pilot actuated check valve which controls when PBV 620 closes. SV1 623 is a normally closed valve that allows fluid to flow in one direction only and will only open when a certain minimum pilot pressure is experienced in the pilot line. Typically, the pressure required to open the valve is not an adjustable value. The pilot pressure is supplied from primary accumulator bank 650*e* through either MDV 621 or electrically operated solenoid disconnect valve 622 upon activation of the disconnect sequence.

Piper ball valve flow control 624 (BV-FLOW) generally is an adjustable flow control valve that allows the rate at which fluid pressure can be lost from SV1 623. Adjusting BV-FLOW 624 can adjust how quickly or slowly SV1 623 will close. Fluid circuit 690 is designed to allow fluid to pass through BV-FLOW 624 in one direction only, i.e. from PBV 620 through SV1 623 and in to BV-FLOW 624 to pass in to HPU 680, as described below.

In an embodiment, third counterbalance valve 625 (CBV3) may be present and act as a counterbalance valve that, in conjunction with second sequence valve 626, controls when, e.g. in sequence, torque tool 123 (FIG. 3) unlocks an emergency quick disconnect system such as emergency quick disconnect system 100 (FIGS. 2-4), allowing bucket 151 (FIG. 3) and drop away assembly 101 (FIG. 4) to fall away from vessel 501 (FIG. 1) and severing a physical fluid transfer link such as fluid conduit 50 (FIG. 1). CBV3 625 controls when pilot pressure is sent to SV2 626. CBV3 625 is a normally closed valve, such as to gate pressure from SV2 626. Once the disconnect sequence has been started, system pressure from either MDV 621 or solenoid driven cartridge valve 622 will pilot open CBV3 625, allowing pressure from the PBV 620 to pilot closed SV2 626 which is a normally open (fail open) valve. As pressure from PBV 620 decreases, pilot pressure passing through CBV3 625 to SV2 626 will also decrease, allowing SV2 626 to open and to allow system pressure access to torque tool 123.

Second sequence valve 626 (SV2) may be present and act as a sequence valve that gates system pressure access to torque tool 123 (FIG. 3). SV2 626, which is a normally open (fail open) valve which initially closes upon activation of the disconnect sequence as described previously, ensures that torque tool 123 will not receive system pressure until PBV 620 has closed. As PBV 620 closes, pressure in fluid conduit 690 is decreasing, e.g. it is being vented to Fluid Reservoir 672 through SV1 623. This back pressure is also serving as pilot pressure to SV2 626 which is holding SV2 626 closed. Once pilot pressure drops enough to allow SV2 626 to open, system pressure can pass through to torque tool 123.

Auxiliary hydraulic supply valve 627 (AHSV) is typically a ball valve that controls main line system pressure access to auxiliary directional valve 610.

Multiple gauges may be present. By way of example and not limitation, main pilot line gauge 628 (P-M) may be present and aid in monitoring pressure within main pilot line 673 where main pilot line 673 receives system pressure upon activation of the disconnect sequence through either MDV 621 or solenoid driven cartridge valve 622 and provides pilot pressure to SV1 623, CBV3 625, CBV1 642, and CBV2 646. Main pressure gauge 629 (MAIN) may be present and act as a gauge that monitors hydraulic pressure in the main line. First accumulator bank gauge 619 (A1) acts as a gauge that monitors oil side pressure in first accumulator bank 650*e*.

Second accumulator supply valve 631 (ASV2) may comprise a ball valve that controls hydraulic pressure access to the second accumulator bank 650 (tanks 650*c* and 650*d*).

System hydraulic supply valve 632 (SHSV) may comprise a ball valve that controls hydraulic pressure access to the entire system from HPU 680, except for ASV2 631.

First accumulator inline valve 633 (AIV1) may be present and comprise a ball valve that controls hydraulic pressure access to the first accumulator bank 650*e* (tanks 650*a* and 650*b*).

First nitrogen fill valve bank 634 (NFV1-1) may be a ball valve that controls nitrogen pressure access to the gas side of first accumulator bank 650*e* tank 650*a*.

HPU access valve 635 (HPUV) may be present and comprise a ball valve that gates all hydraulic pressure to the system from HPU tank 683.

Crossover valve 636 (CV) may be present and typically configured as a ball valve that controls hydraulic pressure to flow between a first accumulator circuit comprising manual valve 621, solenoid driven cartridge valve 622, torque tool 123 (FIG. 3), auxiliary directional valve 610, hose cutter 652, and piper ball valve 620, and a second accumulator circuit comprising access to retention cylinder 651, and may further allow first accumulator circuit 650*e* to access tank 653 directly through tank valve 659. As discussed above, retention cylinder 651 may be part of retraction fork actuator 115 (FIG. 3).

Secondary accumulator access valve 637 (SAAV1) is typically a ball valve that controls hydraulic pressure access to an oil side of second accumulator bank second tank 650*b*.

Second nitrogen fill valve first bank 638 (NFV1-2) is typically a ball valve that controls nitrogen pressure access to a gas side of second accumulator bank 650 tank 650*b*.

Nitrogen supply access valve (NSAV) 639 is typically a ball valve that controls nitrogen pressure access from nitrogen reservoir 653.

Piper ball valve pressure access valve (BV) 640 is a ball valve that controls hydraulic pressure access to PBV 620.

First accumulator output valve 641 (AOV1) is typically a ball valve that gates hydraulic pressure flow from first accumulator bank 650 tanks 650*a* and 650*b* to the system.

First counterbalance valve 642 (CBV1) is a counterbalance valve that gates pilot pressure to fourth sequence valve 645 (SV4) which is a normally closed valve. Pilot pressure to CBV1 is provided through main pilot line 673 through MDV 621 or solenoid driven cartridge valve 622 once the disconnect sequence is activated. Once CBV1 pilots open, it will allow pressure from first accumulator bank 650 tanks 650*a* and 650*b* to pilot open SV4.

Nitrogen Regulator 643 (REG-N2) is an adjustable regulator valve that controls gas side pressure for all accumulator tanks, e.g. 650*a*-650*d*.

Linear cylinder valve B 644 (LCVB) is a ball valve that controls pressure access to port LCB 692 on skid 602 where port LCB 692 provides piston side pressure to retention cylinder 651. When the system is armed, applying positive pressure through LCVB 644 will retract retention cylinder 651 which is supporting bucket 115 (FIG. 3). Once retention cylinder 651 retracts bucket 115 will fall away along with drop away assembly 101 (FIG. 4), thereby severing fluid link 50 (FIG. 1) between vessels.

Second counterbalance valve 646 (CBV2) may be present and used to isolate fourth sequence valve 645 from inline pressure to prevent SV4 645 from leaking forward and building pressure against port LCB 692 which could prematurely extend retention cylinder 115 (FIG. 3) which would in turn expose a connector such as connector 120 (FIG. 2) to be loaded, e.g. prematurely, with a predetermined amount of weight. When CBV2 646 is piloted open, pressure from second accumulator bank 650f (tanks 650c and 650d) can access fourth sequence valve 645. CBV2 646 is piloted by pressure from main pilot line 673 which is supplied with pressure when the disconnect sequence is initiated through either the MDV 621 or solenoid driven cartridge valve 622.

Fourth sequence valve 645 (SV4) is a normally closed (fail closed) valve that when piloted open will allow pressure access to port LCB 692 through LCVB 644. Pilot pressure to SV4 is gated by first counterbalance valve 642 and inline pressure is gated by second counterbalance valve 646. Once the disconnect sequence is started, CBV1 642 will gate open and allow pilot pressure from first accumulator bank 650e tanks 650a and 650b to open SV4 645. At the same time, pilot pressure from main pilot line 673 will open CBV2 646 and allow inline pressure from second accumulator bank 650f tanks 650c and 650d to pass in to SV4 645. CBV1 642 and CBV2 646 share a common pilot line.

Second accumulator output valve 647 (AOV2) is typically a ball valve that gates hydraulic pressure flow from second accumulator bank 650 tanks 650c and 650d to the system.

First nitrogen fill valve second bank 648 (NFV2-1) is typically a ball valve that controls nitrogen pressure access to the gas side of second accumulator 650 tank 650c.

Linear cylinder valve A 649 (LCVA) may be present and is typically a ball valve that controls pressure access to port LCA 691 which provides hydraulic power to the rod side of retention cylinder 651. Applying positive pressure to LCA 691 will cause retention cylinder 651 to retract and slide retention fork assembly 115 (FIG. 3) forward. Retention fork assembly 115 is used to support bucket 151 (FIG. 3) so that retention fork assembly 115 is in the load path of the suspended drop away assembly 101 (FIG. 4) and fluid conduit 50 (FIG. 1). LCVA 649 is opened during the setup process and then closed when the system is armed, trapping rod side pressure between retraction fork actuator 115 and third sequence valve 656, which is a pilot activated check valve. When piloted open during the disconnect sequence, third sequence valve 656 will allow the rod side pressure to relieve to fluid reservoir 672, thus allowing retention cylinder 651 to expand when the piston side is pressured up.

Second accumulator bank gauge 650 (A2) may be present and aid in monitoring oil side pressure in second accumulator bank 650.

Third sequence valve 656 (SV3) may be present and will typically be a piloted check valve that when opened will allow relief of rod side pressure of retention cylinder 651 to fluid reservoir 672. Pilot pressure to SV3 656 is applied when fourth sequence valve 645 and second counterbalance valve 646 are opened, allowing pressure to pass from second accumulator bank 650f tanks 650c and 650d.

Fourth pilot gauge 657 (P-4) may be present and aid in monitoring pilot pressure in sequence valve 645. When the disconnect sequence is not being performed, increasing pressure here will indicate a leak through main line 673 in first counterbalance valve 642.

Second secondary accumulator access valve 658 (SAAV2) may be present and is typically a ball valve that controls pressure access to second accumulator bank 650f tank 650d.

Second nitrogen fill valve bank 659 (NFV2-2) may be present and is typically a ball valve that controls nitrogen pressure access to the gas side of second accumulator bank 650f tank 650d.

Master nitrogen pressure gauge 655 (N2) may be present and is typically a gauge that shows gas side pressure going in to a given accumulator, e.g. 650a-650d.

Pump 671, such as an air pump manufactured by Haskel International, Inc., 100 East Graham Place, Burbank, Calif., United States, may be present and is typically an air activated pump (no ignition source) that maintains pressure against retraction fork actuator 115 (FIG. 3). This helps ensure that retraction fork actuator 115 remains closed and will not open prematurely. Should retention cylinder 651 prematurely expand, it would place a connector such as connector 120 (FIG. 2) in a condition with is loaded prematurely with weight. Pump 671 will maintain a set pressure as governed by how much air is supplied to it. Pump air regulator 657 (REG-H), such as an air pump regulator manufactured by Haskel International, Inc., 100 East Graham Place, Burbank, Calif., United States, may be present and is typically an adjustable regulator that determines what pressure pump 671 will maintain. Air diaphragm supply valve 660 (ADSY) may be present and is typically a ball valve that controls oil access to pump 671. If present, third sequence valve pilot pressure gauge 658 (P-3) aids in monitoring pressure output from fourth sequence valve 645 which serves as pilot pressure for SV3 656. Premature pressure buildup here would indicate that CBV2 646 is opening due to overbalance and line pressure is leaking forward through SV4 645. Tank access valve 659 (TANK) may be present and is typically a ball valve that allows direct access to a tank such as fluid reservoir 672 for second hydraulic circuit 603 and, if crossover valve 636 is opened, for first hydraulic circuit 602 as well.

Referring to FIG. 19, in a further embodiment skid 603 is similar to skid 601 (FIG. 17) and/or skid 602 (FIG. 18) and may be used with, or may otherwise be part of, emergency quick disconnect system 300 as described herein above in FIGS. 8-13b. Similar to skids 601 (FIGS. 17) and 602, while counterbalance valves and sequence valves accomplish the same thing, due to differences in manufacturing process sequence valves will leak through their main line at a rate that is several orders of magnitude greater than the leak rate of counterbalance valves. All three counterbalance valves in second hydraulic circuit 603 serve to gate off pressure access to the sequence valve pilot lines until the disconnect sequence is initiated. However, differences exist. For example, as opposed to the embodiment illustrated in FIG. 18, a second accumulator circuit used with tanks 650c and 650db as illustrated in FIG. 19 may not be used in this embodiment.

Third counterbalance valve 625a (CBV3) may be present and act as a counterbalance valve that, in conjunction with second sequence valve 626, controls when, e.g. in sequence, cylinder 651, which may be part of actuator 311 (FIG. 12A), will retract, allowing drop away assembly 302 (FIG. 10) to fall away from vessel 501 (FIG. 1) severing a physical fluid transfer link such as fluid conduit 50 (FIG. 1). CBV3 625a controls when pilot pressure is sent to SV2 626. CBV3 625a is a normally closed valve, such as to gate pressure from SV2 626. Once the disconnect sequence has been started, system pressure from either MDV 621 or solenoid driven cartridge valve 622 will pilot open CBV3 625, allowing pressure from PBV 620 to pilot closed SV2 626 which is a normally open (fail open) valve. As pressure from PBV 620 decreases, pilot pressure passing through CBV3 625 to SV2 (626) will also decrease, allowing SV2 626 to open and to allow system pressure access to retract cylinder 651.

Second sequence valve 626a (SV2) is similar to second sequence valve 626 (FIG. 18) but gates system pressure access to retract cylinder 651. SV2 626a ensures that cylinder 651 will not receive system pressure until PBV 620 has closed. As PBV 620 closes, pressure in the ball valve's line is decreasing (being vented to fluid reservoir 672 through SV1 623). This back pressure is also serving as pilot pressure to SV2 626a which is holding the valve closed. Once pilot pressure drops enough to allow the valve to open, system pressure can pass through to cylinder 651. This valve is a normally open (fail open) valve and will initially close upon activation of the disconnect sequence as described previously.

Similar to crossover valve 636 (FIG. 18), crossover valve 636a (CV) may be present and typically configured as a ball valve that controls hydraulic pressure to flow between a first accumulator circuit comprising MDV 621, solenoid driven cartridge valve 622, the rod side of cylinder 651, auxiliary directional valve 610, hose cutter 652, and piper ball valve 620, and a second accumulator circuit comprising fluid reservoir 672 and retention cylinder 651, and may further allow the first accumulator circuit to access fluid reservoir 672 directly through tank valve 659 (TANK).

Similar to LCVA 649 (FIG. 18), LCVA 649a may be present and is typically a ball valve that controls pressure access to port LCA 693 which provides hydraulic power to extend cylinder 651. Applying positive pressure to LCA 693 will cause cylinder 651 to press closed, maintaining the fluid connection between vessels 501,502 (FIG. 1). LCVA 649a is opened during the setup process and then closed when the system is armed, trapping piston side pressure between cylinder 651 and third sequence valve 656 (SV3), which is a pilot activated check valve. When piloted open during the disconnect sequence, SV3 656 will allow the piston side pressure to relieve fluid reservoir 672, thus allowing cylinder 651 to retract and disconnect.

Similar to SV3 656 (FIG. 18), SV3 656a may be present and configured as a piloted check valve that when opened will allow piston side pressure of cylinder 651 to be relieved to fluid reservoir 672. Pilot pressure to SV3 656a is applied when SV2 626 is opened and passes through 661 and 644.

Similar to pump 671 (FIG. 18), pump 671a may be present and is typically an air activated pump (no ignition source) that maintains pressure to keep cylinder 651 extended. This helps ensure that cylinder 651 will not close due to pressure loss.

P-3 658 is similar to P-3 658 above (FIG. 18) and aids in monitoring pressure which should only be rising during activation.

Air diaphragm supply valve (ADSY) 660 may be present and comprise a ball valve that controls oil access to pump 671a.

Figure 10:
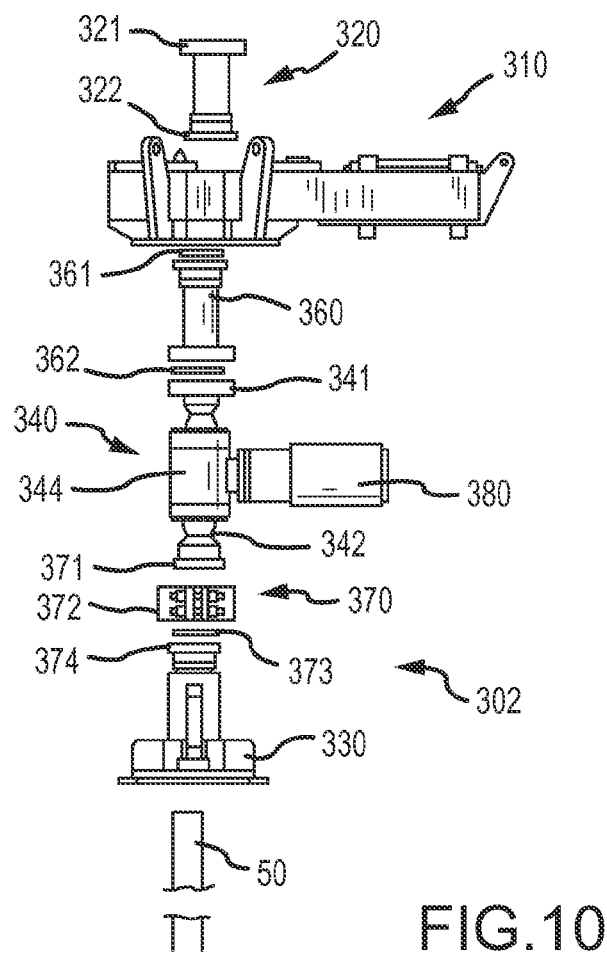
FIGS. 10 is an exploded view in partial perspective of the exemplary embodiment of the third embodiment of an emergency quick disconnect system.
Figure 11:
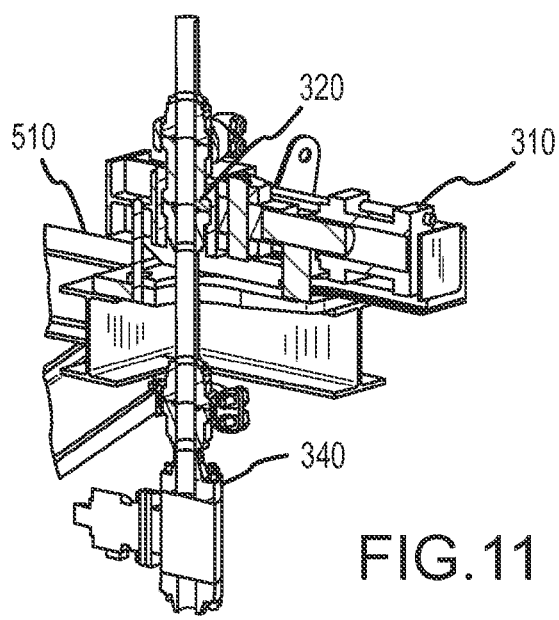
FIG. 11 is a cross-sectional view in partial perspective of the exemplary embodiment of the third embodiment of an emergency quick disconnect system.

In the operation of exemplary embodiments, generally referring to FIGS. 20-27, two fluid conduits such as 50a,50b (FIG. 1) may be releasably interconnected by deploying any of the disclosed emergency quick disconnect systems such as system 601 (FIG. 2) onto a standard frac hanger. First fluid conduit 50a is connected to a first appropriate connector, e.g. connector 120 (FIG. 2), 220 (FIG. 7), or 320 (FIG. 10). Pressure internal to either first fluid conduit 50a or second fluid conduit 50b or both is vented the prior to opening a valve such as valve 344 (FIG. 10) to allow fluid flow within and between first fluid conduit 50a and second fluid conduit 50b. After venting, first fluid conduit 50a is released from a remote location after venting, the remote location being one of a bridge and a boat deck.

Figure 20:
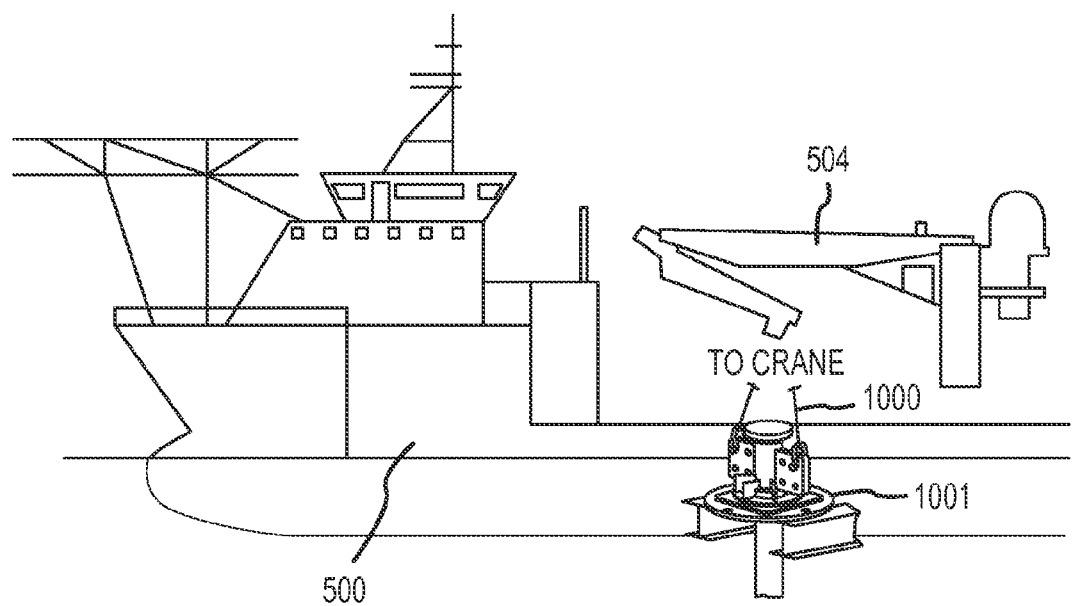
FIG. 20 is a view in partial perspective with an exploded view of an exemplary emergency quick disconnect system and a vessel.
Figure 21:
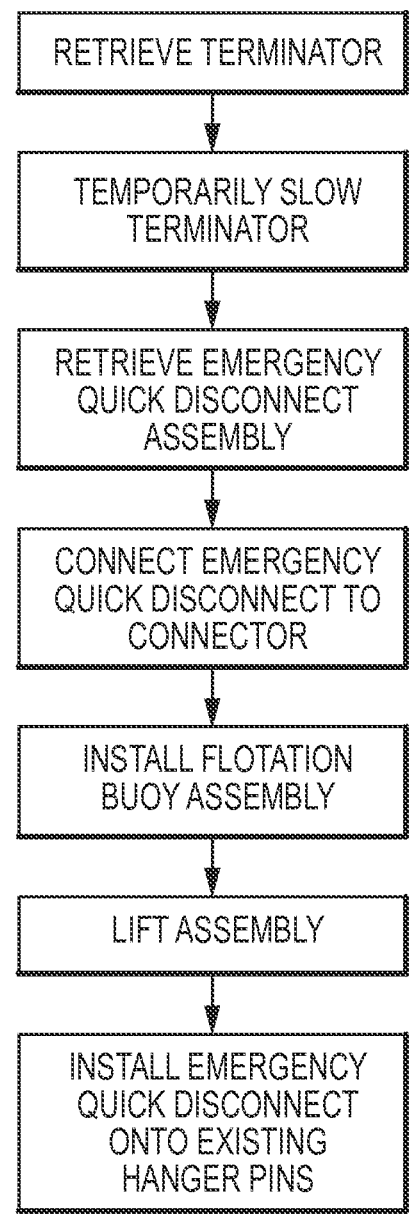
FIG. 21 is a flowchart of an exemplary general method of deploying an exemplary emergency quick disconnect system.
Figure 22A:
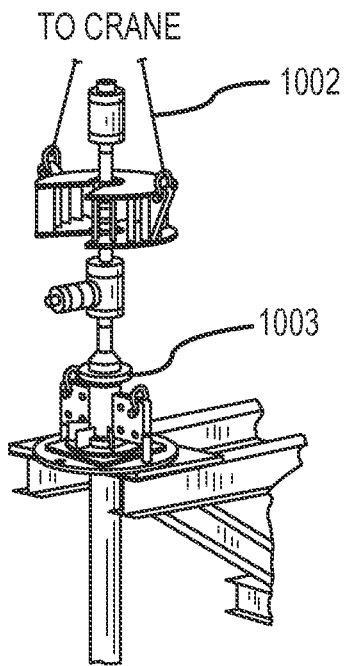
Figure 22B:
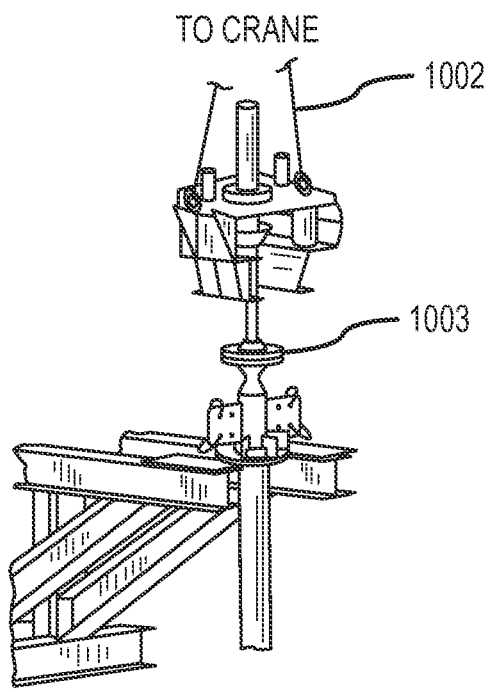
Figure 23:
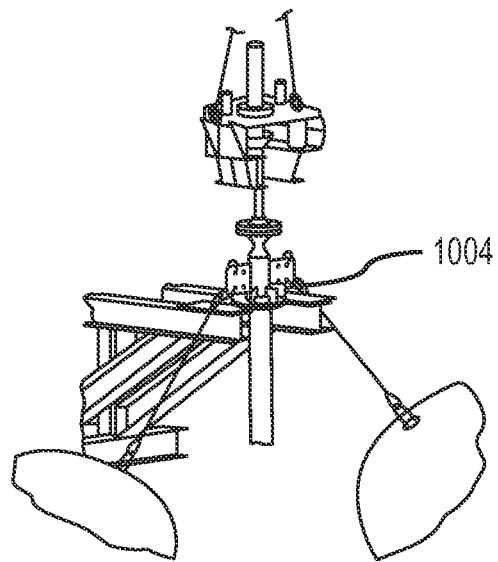

In general, referring generally to FIGS. 20-21, a fluid conduit terminator such as described above is retrieved, e.g. using crane 504 as illustrated in FIGS. 22A and 22B at 1002-1003 and, optionally, stored temporarily such as onto alignment pins 505 (FIG. 3). A disclosed emergency quick disconnect systems such as system 601 (FIG. 2) is retrieved e.g. using crane 504, and connected to a connector such as connector 120 (FIG. 2). In certain embodiments, a floatation buoy assembly such as 60 (FIG. 14) may be installed as described herein above and as illustrated at FIG. 23 at 1004. The assembled components may then be lifted, e.g. using crane 504, and installed on a frac hanger such as 510 (FIG. 2), e.g. by installing the assembly onto alignment pins 505 (FIG. 3) as illustrated in FIGS. 24A and 24B at 1005 and 1006.

Figure 26:
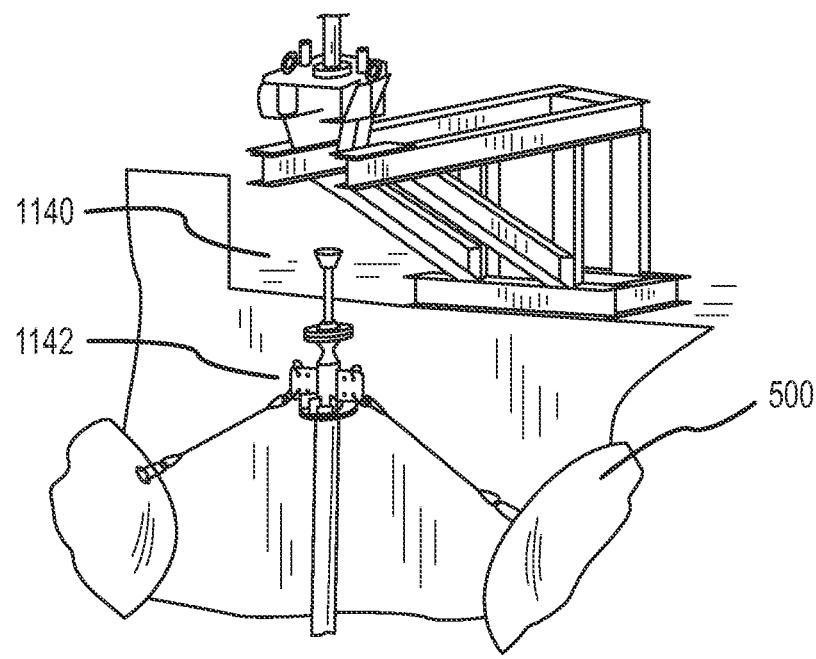
Figure 27:
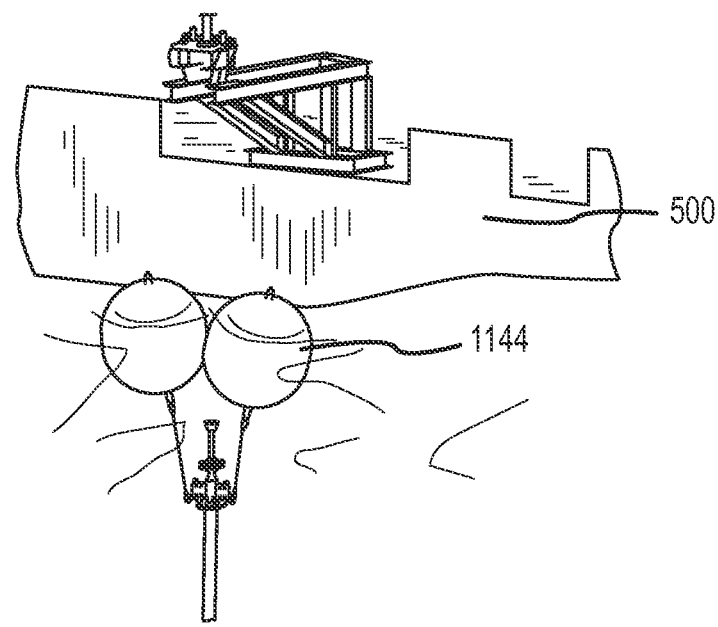

Referring generally to FIGS. 25-27, a valve as described herein is closed as illustrated at 1100 (FIG. 25) and a terminator as described herein is opened as illustrated at 1110 (FIG. 25). This can occur, for example, by communicating with one of the two vessels 500 (FIG. 1) to stop pumping and relieve pressure as illustrated at 1140 (FIG. 26).

A drop away assembly such as 101 (FIG. 4) is then allowed to fall away as illustrated at 1120 (FIG. 25) and a check valve as described herein closes automatically due to lack of pressure as illustrated at 1130 (FIG. 25). If attached, a floatation buoy assembly such as buoyancy apparatus 60 (FIG. 14) then maintains the drop away assembly at or near a water surface as illustrated at 1144 (FIG. 27).

In a second general method, two fluid conduits are interconnected by deploying a well stimulation emergency quick disconnect system such as any of the emergency quick disconnect systems discussed above onto a standard frac hanger such as 510 (FIG. 2). First hydraulic hose 50a is connected to the well stimulation emergency quick disconnect system and second hydraulic hose 50b to the well stimulation emergency quick disconnect system. Internal pressure to fluid hydraulic hoses 50a,50b is vented prior to releasing an emergency quick disconnect system such as system 100 (FIG. 2) and then at least one of first hydraulic hose 50a or second hydraulic hose 50b is released from a remote location after venting, often in less than 15 seconds.

In a third general method, two fluid conduits are interconnected by deploying any of the well stimulation emergency quick disconnect systems as described herein onto a standard frac hanger as described herein. First high-pressure hydraulic hose 50a is connected to a first appropriate connector on the well stimulation emergency quick disconnect system and second high-pressure hydraulic hose 50b connected to a second appropriate connector of the well stimulation emergency quick disconnect system.

In any of the methods, and with any of the embodiments, once the hydraulic system is actuated, the valve is closed and the release is opened, the pressure line drops free, e.g. 50b. If buoys 62 or 64 are used, once the connection is opened and line 50b drops free, it is able to be re-connected while still off-shore.

In a further embodiment, two fluid conduits, e.g basically show as hose 50 (FIG. 1), may be interconnected by deploying a well stimulation emergency quick disconnect system, e.g. 601 (FIG. 2) onto hanger 510 (FIG. 1) which may be a standard frac hanger; connecting first hydraulic hose 50a to well stimulation emergency quick disconnect system 601; connecting second hydraulic hose 50*b* to well stimulation emergency quick disconnect system 601; releasing at least one of first hydraulic hose 50*a* or second hydraulic hose 50*b* by issuing a venting command from a remote location after venting is completed; and re-connecting the released hose on-site, without having to return to the dock.

In a further embodiment, a well stimulation emergency quick disconnect system, e.g. 200 (FIG. 2), may be used for well-stimulation jobs in which two vessels such as 501 and 502 (FIG. 1) are "joined," e.g. via riserless-intervention chemical supply line(s) such as fluid conduit 50. By way of example, two such vessels may be required to be connected via high-pressure flex hoses.

Referring additionally now to FIGS. 2-4 and 18, with respect to the embodiment exemplified in FIGS. 2-4, emergency disconnect system 100 (FIG. 2) may be used to terminate a downstream fluid hose such as hose 50*b* with hose terminator 130 (FIG. 2) and temporarily stow the terminated fluid hose 50*b*.

An emergency disconnect system such as emergency disconnect system 100, as described herein, is retrieved and connected to hose terminator 130 (FIG. 2). In certain embodiments, hose terminator 130 may be retrieved, e.g. with crane 504 (FIG. 20), and temporarily stowing onto frac hanger 510 (FIG. 2). An emergency disconnect system such as emergency disconnect system 100 (FIG. 2) and its connected hose terminator 130 may be positioned proximate frac hanger 510 and secured into frac hanger 510. When a skid such as skid 602 (FIG. 18) is activated occurs, a valve such as valve 140 (FIG. 2) is closed and a connector such as connector 120 (FIG. 2) is opened. A torque tool such as torque tool 123 (FIG. 3) may be used to open connector seal 153 (FIG. 4). Retraction fork 113 (FIG. 2) is then retracted, allowing drop away assembly 101 (FIG. 4) to fall away. In embodiments, check valve 241 is allowed to close automatically due to lack of pressure. A flotation system, such as 62 and 64 described herein above, may be attached to drop away assembly 101 (FIG. 4).

Figure 5:
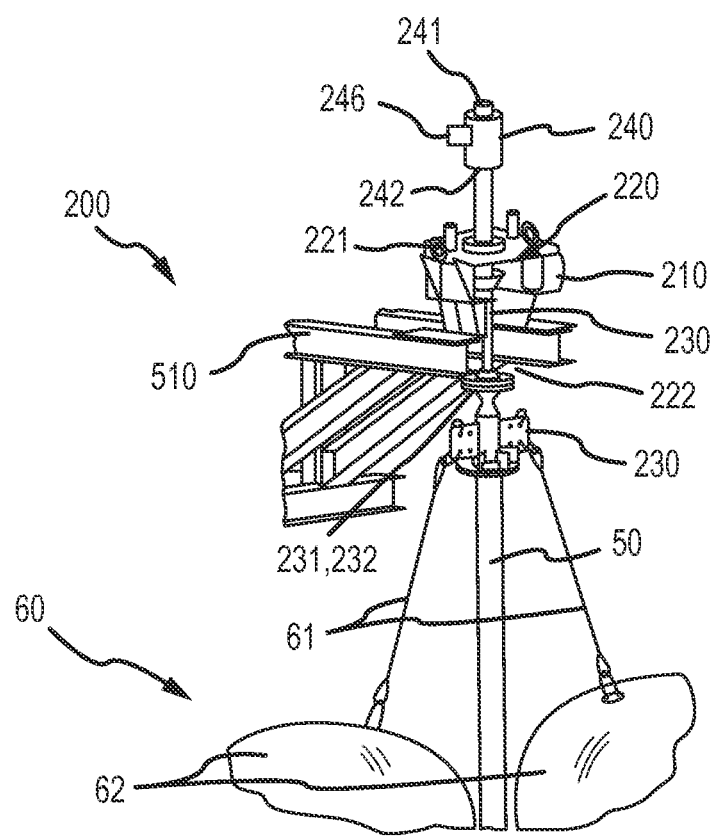
FIG. 5 is a view in partial perspective of an exemplary embodiment of a second embodiment of an emergency quick disconnect system.

In a further embodiment, with respect to the embodiment exemplified in FIGS. 5-7, downstream fluid hose 50 is terminated with hose terminator 230 (FIG. 5) and terminated fluid hose 50 (FIG. 5) temporarily stowed. Additionally, hose terminator 230 may be retrieved, e.g. with crane 504 (FIGS. 22A and/or 22B), and temporarily stowed onto frac hanger 510 (FIG. 5). Emergency disconnect system 200, which is as described above, may be retrieved and connected to hose terminator 230. Once connected, emergency disconnect system 200 and its connected hose terminator 230 and positioned proximate to and secured to frac hanger 510. As above, a flotation system such as buoy 62 may attached be to drop away assembly 202 (FIG. 5). When activation occurs, valve 270 (FIG. 6) is closed and connector 220 (FIG. 6) opened, allowing drop away assembly 202 (FIG. 6) to fall away. Check valve 240 (FIG. 6) is then allowed to close automatically due to lack of pressure.

In embodiments where connector 220 (FIG. 6) further comprises a drive screw, opening connectors 231*a*, 231*b* (FIG. 7) comprises rotating the drive screw.

In a further embodiment, referring additionally to FIGS. 8-13*b* and 19, with respect to the embodiment exemplified in FIGS. 8-13*b*, downstream fluid hose 50 is terminated with hose terminator 330 (FIG. 9) and terminated fluid hose 50 temporarily stowed. Emergency disconnect system 300 (FIG. 8) may be retrieved where emergency disconnect system 300 is as described above and connected to hose terminator 330. As above, a flotation system such as buoy 62 may attached be to drop away assembly 302 (FIG. 10). Additionally, hose terminator 330 may be retrieved, e.g. with crane 504 (FIGS. 22A and/or 22B), and temporarily stowed onto frac hanger 510 (FIG. 8).

Figure 12:
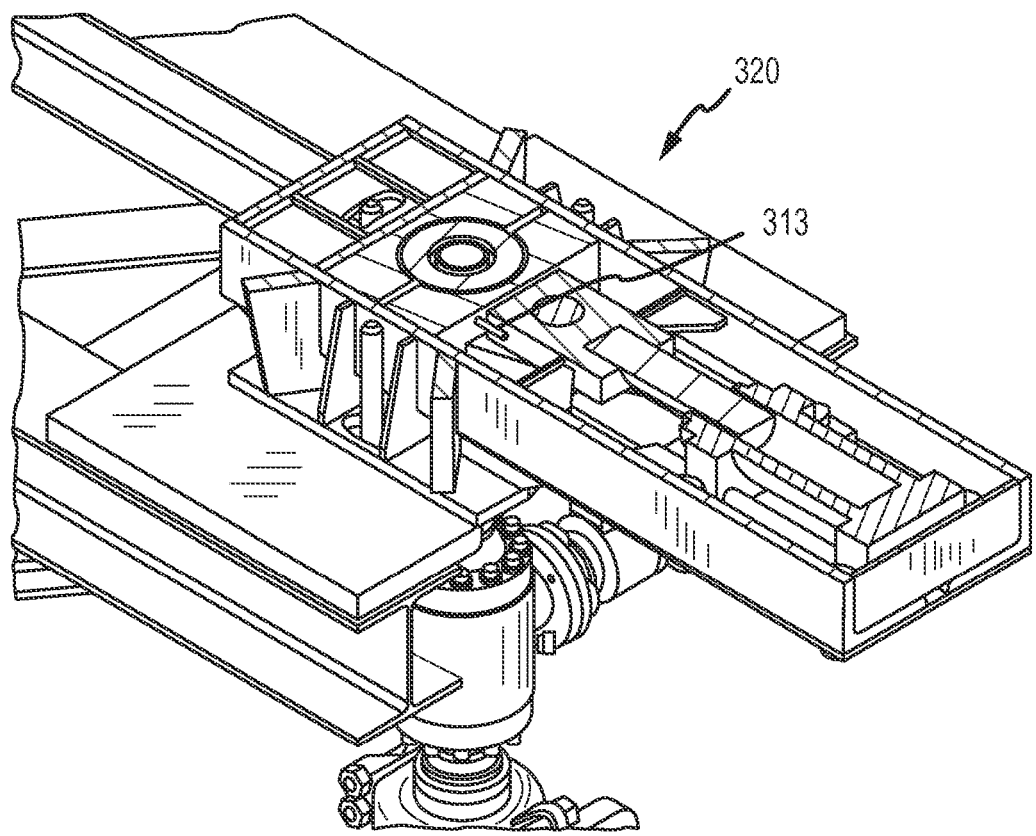
FIG. 12 is a cross-sectional view in partial perspective of an upper portion of the exemplary embodiment of the third embodiment of an emergency quick disconnect system.
Figure 12A:
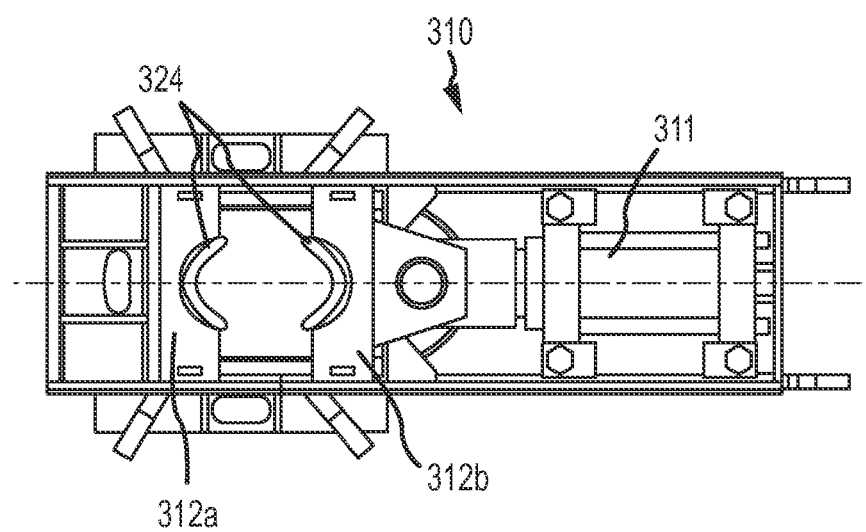
FIGS. 12A and 12B are a cross-sectional view in partial perspective of the upper portion of the exemplary embodiment of the third embodiment of an emergency quick disconnect system.
Figure 12B:
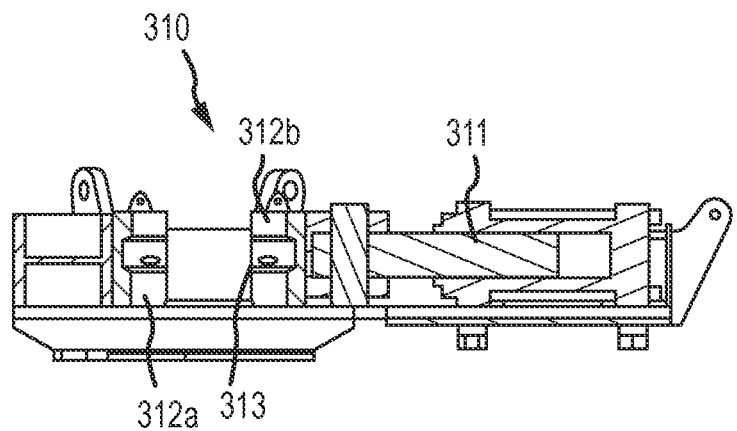
Figure 13A:
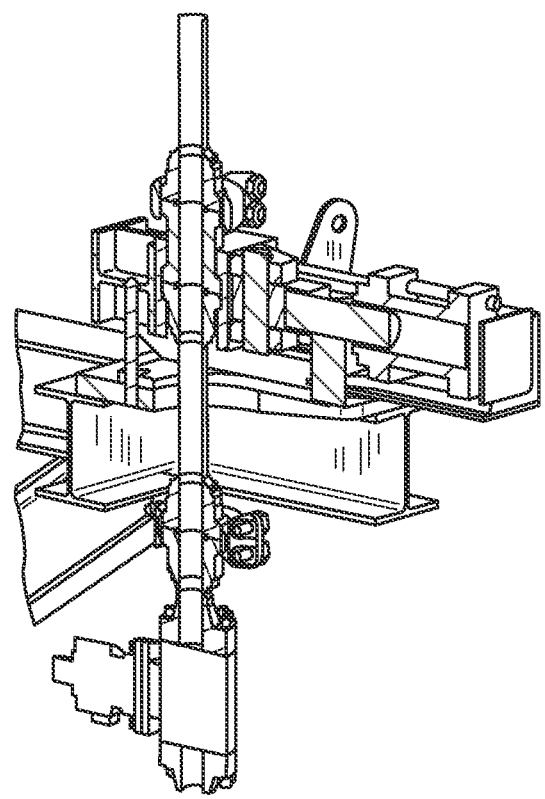
FIG. 13A is a cross-sectional view in partial perspective of the upper portion of the exemplary embodiment of the third embodiment of an emergency quick disconnect system shown in a closed position and FIG. 13B is a cross-sectional view in partial perspective of the upper portion of the exemplary embodiment of the third embodiment of an emergency quick disconnect system shown in an open position.
Figure 13B:
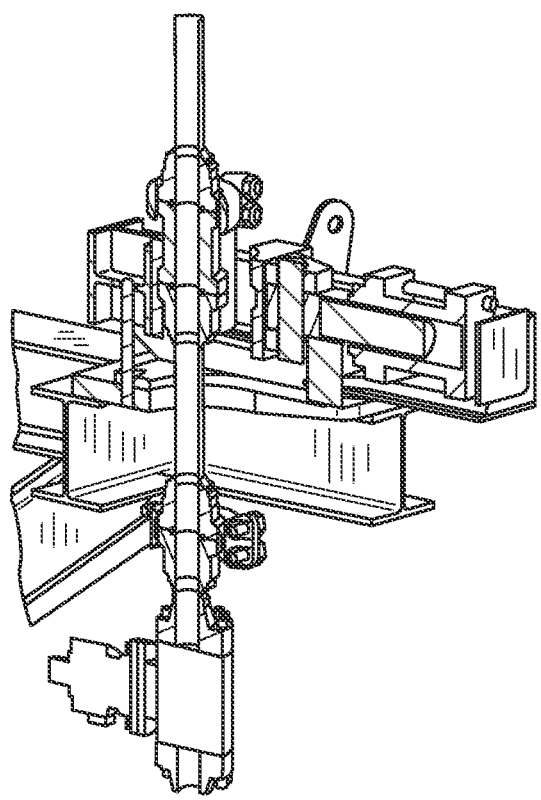

Emergency disconnect system 300 (FIG. 8) and its connected hose terminator 330 (FIG. 8) are then positioned proximate and secured into frac hanger 510 (FIG. 8). When activation of a skid such as skid 603 (FIG. 19) occurs, valve 344 (FIG. 10) is closed and actuator 310 (FIG. 10) retracted which pushes against bottom hub 360 (FIG. 10) using one or more retraction pins 321 (FIG. 12). Drop away assembly 302 (FIG. 10) may then be allowed to fall away and check valve 341 (FIG. 10) allowed to close automatically due to lack of pressure.

In any of these methods, where one or more buoys 62 (FIG. 14) and/or 64 (FIG. 15) are used, any of the emergency disconnect systems discussed above may have floatation system 60 (FIG. 14) attached or buoys 64 connected as described above.

With any of the emergency disconnect systems discussed above an emergency skid such as skids 601 (FIG. 17), 602 (FIGS. 18), and 603 (FIG. 19) may be connected to the emergency disconnect system. Although the operation of skids 601 (FIG. 17), 602 (FIGS. 18), and 603 (FIG. 19) have been described above, in general a skid embodiment such as emergency skid 601 may be operated by connecting skid 601 to an emergency disconnect system, where skid 601 is as described above. Accumulator 650 may be pressurized with a hydraulic fluid and hydraulic fluid released from accumulators 650 when either valve 621 is opened or a signal is sent to open solenoid valve 622. The signal to open solenoid valve 622 may comprise sending an electronic triggering signal to solenoid valve 622 such as by pressing a manual electronic switch.

Valve 621, which may comprise a ball valve, is then closed, e.g. a drop in pressure sensed after valve 621 is closed. Counter-balance valve 613 is opened automatically after the sensed drop in pressure and the emergency disconnect system automatically opened.

Nitrogen tank 653 may be pressurized with a non-flammable fluid, e.g. nitrogen, to re-charge accumulators 650. As noted above, accumulator 650 may comprise a plurality of accumulators arranged in parallel, in series, or a combination thereof.

In embodiments described in FIGS. 2-4 and FIG. 18, opening of connector 120 (FIG. 2) is sensed by counter-balance valves 625 and 642 and, substantially simultaneously, retraction fork 113 (FIG. 3) retracted by energizing hydraulic line cutter 652 which then shears or otherwise cuts valve hydraulic line 690. In these embodiments, automatically opening connector 120 comprises sending hydraulic pressure to torque tool 120 to open connector 120.

Additionally, pump 671 (FIG. 18) or 671*a* (FIG. 19) may be disposed proximate hydraulic skid 602 (FIG. 18) or 603 (FIG. 19) and plumbed with fluid conduit 694 in parallel to valve 620 to keep valve 620 open. If a hydraulic skid comprises a pump, it may be plumbed in parallel to cylinder 651 and valve 620 to keep cylinder 651 extended and valve 620 open by maintaining pressure on cylinder 651 and valve 620. Opening connector 310 may be accomplished by sending hydraulic pressure to cylinder 651 to retract cylinder 651 and simultaneously send pressure to a hydraulic line cutter 652 to shear or otherwise cut valve hydraulic hose 690.

It will be understood that various changes in the details, materials, and arrangements of the parts which have been described and illustrated above in order to explain the nature of this invention may be made by those skilled in the art without departing from the principle and scope of the invention as recited in the appended claims.

We claim:
1. A skid, comprising:
   a. a directional control valve, the motor quick release comprising a fluid input;
   b. a first valve in fluid communication with the fluid input;
   c. a hydraulic motor in fluid communication with the fluid valve, the motor further comprising a fluid feedback;
   d. a fluid reservoir in fluid communication with the hydraulic motor;
   e. a quick connect disposed intermediate and in fluid communication with the hydraulic motor and the fluid reservoir;
   f. a hydraulic power unit (HPU) in fluid communication with the fluid reservoir, the HPU comprising an adjustable pressure relief valve;
   g. an intensifier in fluid communication with the HPU;
   h. a second valve in fluid communication with the three stage intensifier, the second valve comprising a lock-out;
   i. a pressure regulator valve in fluid communication with the second valve;
   j. an electrically actuated valve in fluid communication with the pressure regulator valve and the hydraulic motor;
   k. a third valve in fluid communication with the second valve, the third valve comprising a lock-out;
   l. a hydraulic accumulator in fluid communication with the third valve; and
   m. a second fluid tank in fluid communication with the hydraulic accumulator, the second fluid tank further comprising:
      i. a dry gauge in fluid communication with the hydraulic accumulator;
      ii. a fluid tank;
      iii. a fourth valve disposed intermediate and in fluid communication with the hydraulic accumulator and the fluid tank, the fourth valve comprising a lock-out and configured as a fluid isolation valve with respect to the fluid tank;
      iv. a pressure relief valve;
      v. a fifth valve disposed intermediate and in fluid communication with the fluid tank and the pressure relief valve, the fifth valve comprising a lock-out and configured as a fluid isolation valve with respect to the fluid tank; and
      vi. a pressure vent in fluid communication with the pressure relief valve.
2. The skid of claim 1, further comprising a motor quick release disposed intermediate and in fluid communication with the first valve and the electrically actuated valve, the motor quick release in further fluid communication with the hydraulic motor.
3. The skid of claim 1, wherein the first valve comprises a ball valve.
4. The skid of claim 1, wherein the second valve comprises a ball valve.
5. The skid of claim 1, wherein the third valve comprises a ball valve.
6. The skid of claim 1, wherein the fourth valve comprises a ball valve.
7. The skid of claim 1, wherein the fifth valve comprises a ball valve.
8. The skid of claim 1, wherein the pressure vent is configured to vent fluid into the surrounding atmosphere.
9. The skid of claim 1, wherein the fluid tank is configured as a tank for containing nitrogen at a pressure of around 3000 psi.
10. The skid of claim 1, wherein the hydraulic accumulator comprises a plurality of hydraulic accumulators.
11. The skid of claim 1, wherein each of the hydraulic accumulators is configured to accumulate around 15 gallons of fluid.
12. The skid of claim 1, wherein the pressure regulator valve is configured to regulate pressures of from around 3000 to 5000 psi.
13. The skid of claim 1, wherein the electrically actuated valve comprises a non-proportioning valve.
14. The skid of claim 1, wherein the HPU comprises an adjustable pressure relief valve.
15. The skid of claim 1, wherein the intensifier comprises a multistage intensifier in fluid communication with the HPU.
16. The skid of claim 15, wherein the multistage intensifier comprises a three stage intensifier.
17. The skid of claim 1, wherein directional control valve comprises:
   a. a first fluid input in fluid communication with the first valve; and
   b. a second fluid input in fluid communication with the fluid reservoir.
18. The skid of claim 17, wherein the second fluid input is also in fluid communication with the hydraulic motor.
19. The skid of claim 17, further comprising a sixth valve disposed intermediate and in fluid communication with the second fluid input and the hydraulic motor.
20. The skid of claim 19, wherein the sixth valve comprises a ball valve.

* * * * *